United States Patent
Jamtgaard et al.

(10) Patent No.: US 8,615,254 B2
(45) Date of Patent: Dec. 24, 2013

(54) TARGET LOCALIZATION UTILIZING WIRELESS AND CAMERA SENSOR FUSION

(75) Inventors: Mark Jamtgaard, Mountain View, CA (US); Nathan Mueller, Mountain View, CA (US)

(73) Assignee: NearBuy Systems, Inc., San Mateo, CA (US)

( * ) Notice: Subject to any disclaimer, the term of this patent is extended or adjusted under 35 U.S.C. 154(b) by 0 days.

(21) Appl. No.: 13/211,969

(22) Filed: Aug. 17, 2011

(65) Prior Publication Data

US 2012/0046044 A1    Feb. 23, 2012

Related U.S. Application Data

(60) Provisional application No. 61/374,989, filed on Aug. 18, 2010.

(51) Int. Cl.
- *H04W 24/00* (2009.01)
- *H04N 7/18* (2006.01)
- *G06T 15/10* (2011.01)
- *G06K 9/00* (2006.01)

(52) U.S. Cl.
USPC ......... 455/456.1; 348/143; 345/427; 382/107

(58) Field of Classification Search
USPC ...................................... 455/456.1
See application file for complete search history.

(56) References Cited

U.S. PATENT DOCUMENTS

| | | | |
|---|---|---|---|
| 2005/0093976 A1* | 5/2005 | Valleriano et al. | 348/143 |
| 2008/0303901 A1 | 12/2008 | Variyath et al. | |
| 2010/0103173 A1* | 4/2010 | Lee et al. | 345/427 |
| 2010/0150404 A1 | 6/2010 | Marks et al. | |

FOREIGN PATENT DOCUMENTS

| | | |
|---|---|---|
| KR | 10-2010-0025338 | 3/2010 |
| KR | 10-2010-0026776 | 3/2010 |

OTHER PUBLICATIONS

International Search Report and the Written Opinion of the International Searching Authority dated Apr. 9, 2012 for Application No. PCT/US2011/048294, 9 pages.

International Preliminary Report on Patentability for International Patent Application No. PCT/US2011/048294, filed Aug. 18, 2011. 6 Pages.

* cited by examiner

*Primary Examiner* — Timothy Pham
(74) *Attorney, Agent, or Firm* — Fish & Richardson P.C.

(57) ABSTRACT

According to some implementations, an estimate of a target's location can be calculated by correlating Wi-Fi and video location measurements. This spatio-temporal correlation combines the Wi-Fi and video measurements to determine an identity and location of an object. The accuracy of the video localization and the identity from the Wi-Fi network provide an accurate location of the Wi-Fi identified object.

15 Claims, 24 Drawing Sheets

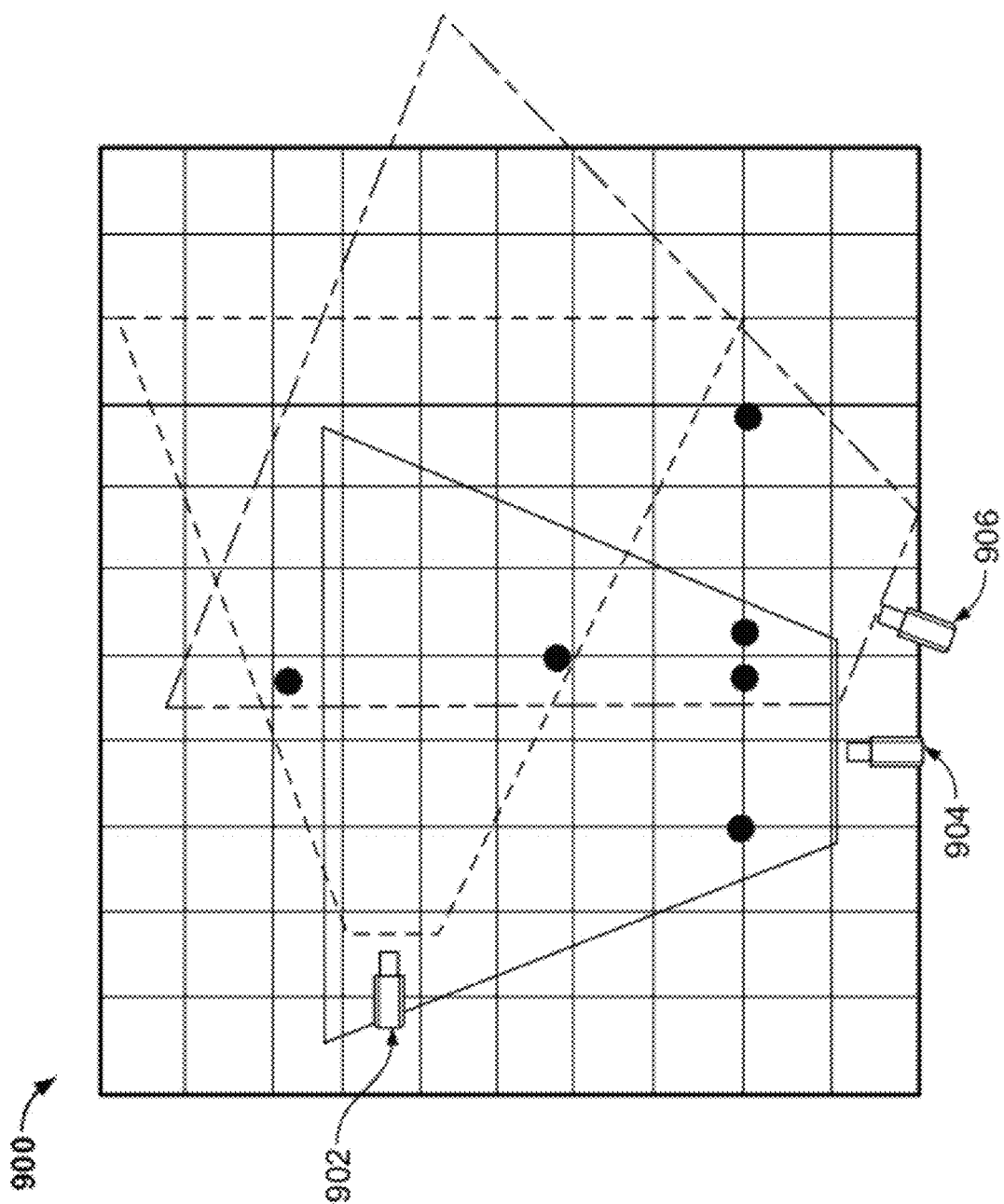

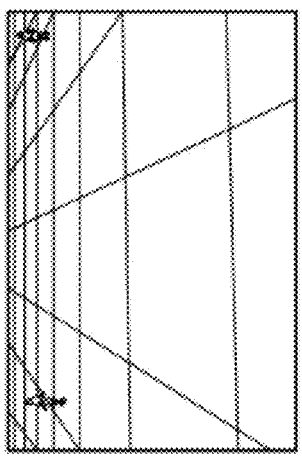
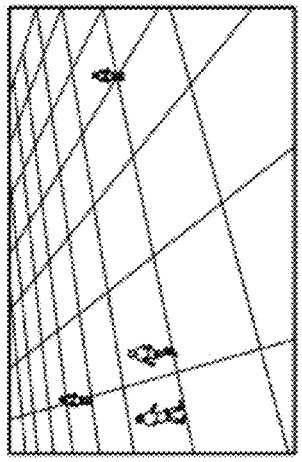
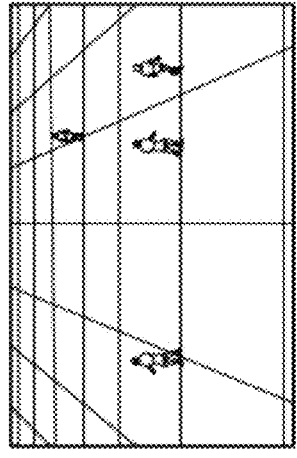
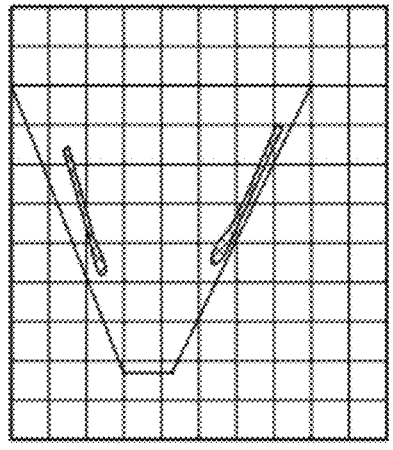
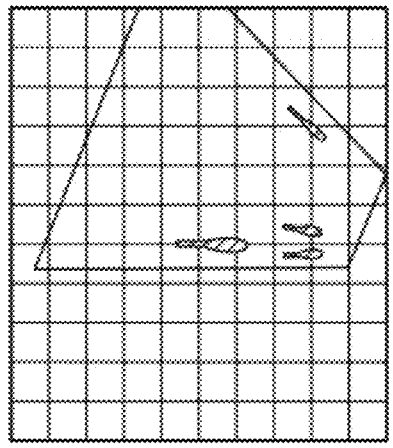
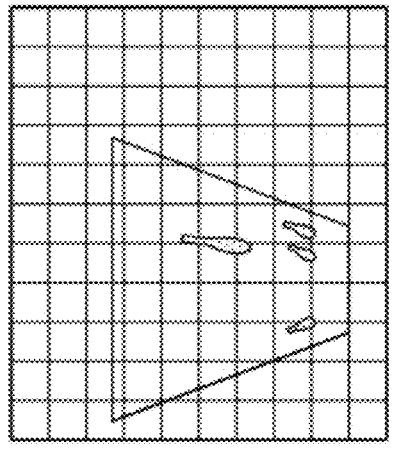

Combined Occupancy Grid

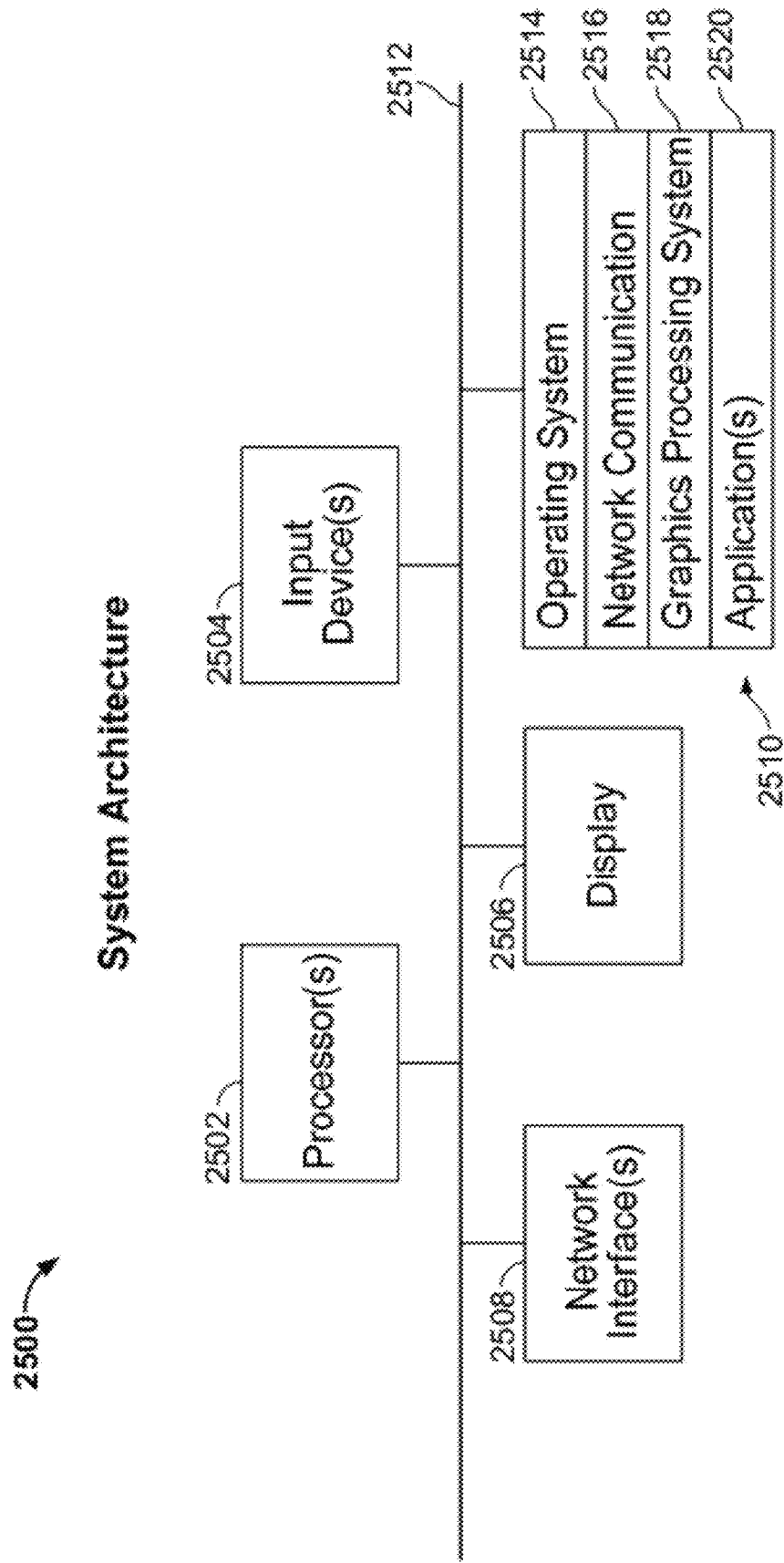

TARGET LOCALIZATION UTILIZING WIRELESS AND CAMERA SENSOR FUSION

CROSS-REFERENCE TO RELATED APPLICATIONS

This application claims priority to U.S. Provisional Application Ser. No. 61/374,989, entitled "Spatio-Temporal Association of Wireless and Video Localization Systems," filed on Aug. 18, 2010, the entire contents of which are incorporated herein by reference.

TECHNICAL FIELD

This invention relates to location-based services (LBS) and the determination of the location of a person or object carrying a wireless device.

BACKGROUND

Many wireless systems such as global positioning systems (GPS), Wi-Fi, Bluetooth beacons and ultra-wideband, and techniques, such as Received Signal Strength (RSS), time difference of arrival (TDOA), angle of arrival (AOA), or time of arrival (TOA) exist to determine the position of a radio-frequency device. Wi-Fi infrastructure is widely deployed and the ability to use this infrastructure for LBS is desirable. Many LBS services require position accuracy of less than one meter. However, this is difficult to achieve in Wi-Fi location systems due to multipath. An additional feature of Wi-Fi is that identity can be determined from media access control (MAC) addresses or other network identity protocols (e.g., internet protocol addresses).

Video camera networks can be used to track people or objects and determine their location. Location accuracy of less than one meter can be achieved using video cameras. Although this position accuracy is important, determining a person or object's identity is required for most applications. Determining identity based on appearance in a video is difficult and prone to error.

Applications requiring the location of wireless mobile devices are referred to as location based services or LBS. These services require the identity of the device and the device's location. A person with a wireless device can be located in several ways. A GPS within their mobile phone can report the user's location. In this scenario, the mobile application queries the GPS and forms a request including their location for the LBS. Unfortunately, GPS has the disadvantage of not working indoors.

Another method to locate the user of a mobile device is to use wireless infrastructure such as Wi-Fi access points to triangulate their location based on radio waves emitted by the device. Three or more wireless receivers record the received signal strength or the angle of arrival of the radio frequency signals from the mobile device. These receivers could be Wi-Fi, Bluetooth, RFID, or other wireless devices. A location server processes the data from these receivers to triangulate the mobile device's location. The application queries the location server for the user's device location. The location server ties the radio waves to the specific person's mobile device using MAC addresses or other network identity protocols. Unfortunately, both GPS and Wi-Fi triangulation frequently cannot give the accuracy necessary for emerging applications, especially for indoor environments with RF multipath.

Another method is to use video cameras to visually determine a person's location. This method has the advantage of being very accurate, however it has a large disadvantage. A video camera system cannot identify which person is making a location based query with their mobile device. Moreover, there is no way for the mobile application to associate itself with a visual based location system; the visual based system can only calculate where someone is, it cannot figure out who they are.

SUMMARY

Implementations described herein solve the above problems and limitations by fusing together the Wi-Fi and video localization modules. As a target moves, its trajectory can be tracked on both the Wi-Fi localization module and the video localization module. An estimate of the target's location can be calculated by fusing the Wi-Fi and video measurements. This spatio-temporal correlation fuses together the Wi-Fi and video tracks to determine an identity and location of an object. The accuracy of the video localization and the identity from the Wi-Fi network provide an accurate location of the Wi-Fi identified object.

BRIEF DESCRIPTION OF THE DRAWINGS

FIG. 9 illustrates cameras having both overlapping and non-overlapping regions.

FIGS. 10A-10C illustrate camera images covering a scene with six people.

FIGS. 10D-10F illustrate occupancy grids generated based on the images of FIGS. 10A-10C.

FIG. 25 is a block diagram of an exemplary system architecture implementing the features and processes of FIGS. 1-24.

DETAILED DESCRIPTION

Wi-Fi Localization Technology

Figure 1:
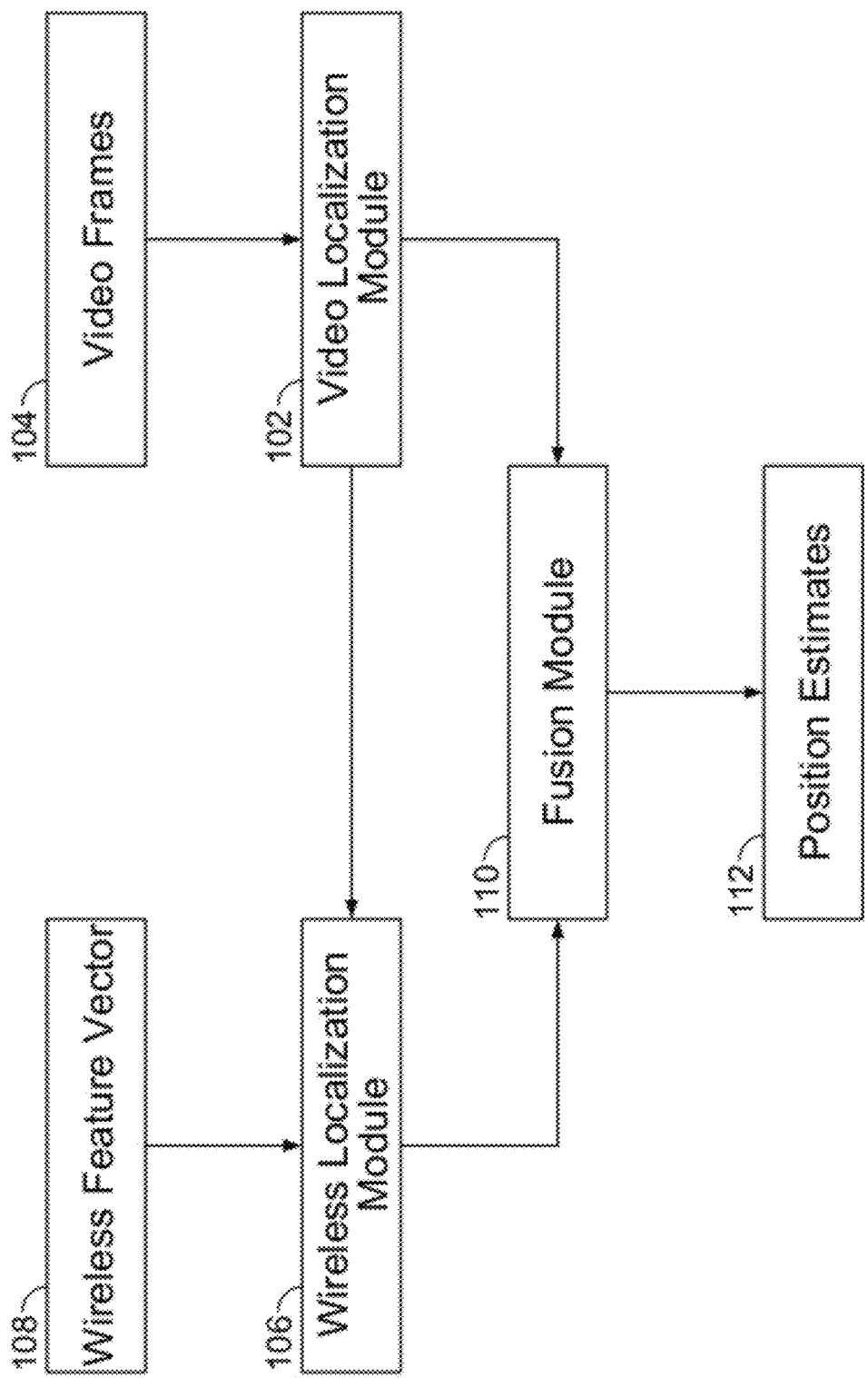
FIG. 1 illustrates an example system for target localization utilizing wireless and camera sensor fusion.

FIG. 1 illustrates an example system 100 for target localization utilizing wireless and camera sensor fusion. System 100 can include a video localization module 102 for processing video frames 104 and generating video tracks. Video localization module 102 can calculate the probability of occupancy for positions or locations that have video coverage. Wireless localization module 106 can estimate the positions of targets through calculations comprising wireless feature vectors 108 and occupancy probabilities received from video localization module 102. Fusion module 110 estimates the positions of targets 112 by combining target probabilities from wireless localization module 106 and occupancy probabilities from the video localization module 102.

Figure 2:
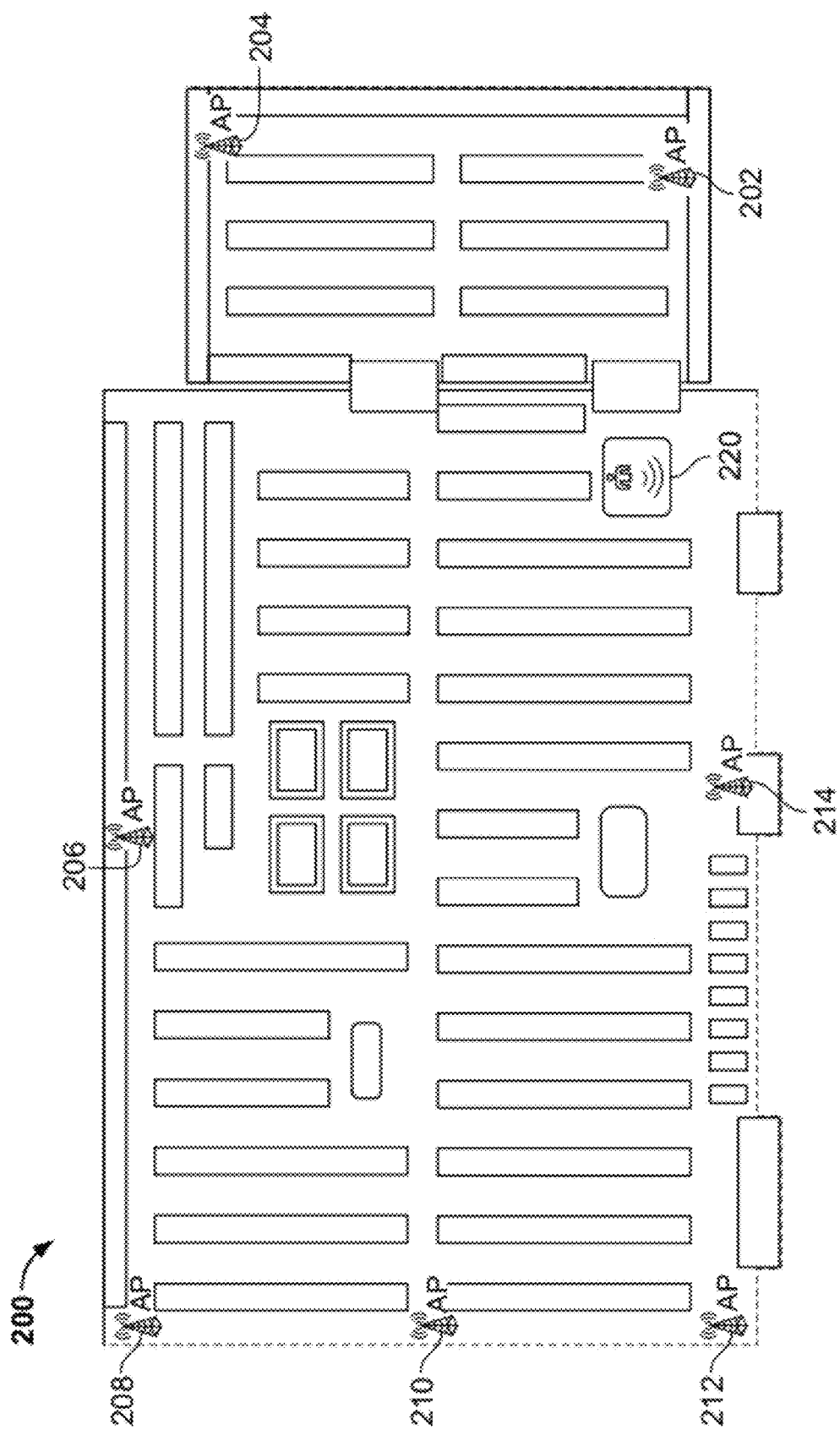
FIG. 2 illustrates a floor plan of a building having cameras for performing target localization.

Due to the proliferation of Wi-Fi access points, indoor localization methods based on Wi-Fi signal strengths are becoming more and more attractive because they don't require additional infrastructural costs beyond the existing Wi-Fi infrastructure. FIG. 2 illustrates a floor plan 200 of a building having seven wireless access points (AP), or sensors, 202-214 distributed at the edges of the building. For example, the wireless access points can be configured to comply with standards specified by IEEE 802.11. The goal is to determine the location of the person carrying a Wi-Fi enabled device 220.

There are many methods to perform Wi-Fi localization. Three popular methods are: 1) RF propagation models using receive signal strength (RSS), 2) pattern matching using a wireless feature vector such as RSS, and 3) time difference of arrival (TDOA). All of these methods have difficulty achieving less than ten meters of accuracy due to multipath. Multipath is a phenomenon where an electromagnetic wave follows multiple paths to a receiver, not just the direct path. Three effects cause multipath: reflections, scattering, and diffraction. Reflections occur when an electromagnetic wave encounters an obstacle whose size is bigger than the wavelength of the signal. The wavelength of 2.4 GHz Wi-Fi signals is 12.5 cm. Scattering occurs when an electromagnetic wave encounters an obstacle whose size is smaller than the wavelength of the signal. Diffraction occurs when an electromagnetic wave encounters a surface with irregular edges causing it to travel along a path other than the line of sight. Multipath can make it very difficult to determine accurate location and degrades all three methods of localization.

When using RSS for localization, it can be difficult to create an accurate propagation model due to multipath. In a TDOA system, it is difficult to find the first arrival due to constructive and destructive multipath waves arriving shortly after the direct path. For both of these systems, it is difficult to attain better than ten meters of accuracy. The difficulty in using pattern-matching methods is due to the RF environment and multipath not remaining static. The signal strength the APs receive from the same location changes as objects are moved within the building or the background RF environment changes. Thus, with these changing variables, it is hard to achieve good accuracy based on pattern matching of signal strength for an extended period of time. Although some implementations for target localization are described in terms of RSS pattern matching, any pattern matching technique can be used to perform target localization. For example, time-of-arrival (TOA), time-difference-of-arrival (TDOA), forward link received signal strength, received signal strength histograms, and multipath signatures can be employed to perform target localization.

In some implementations, each localization target can be transmitting over a Wi-Fi network to multiple access points that measure the received signal strength (RSS). Wi-Fi fingerprinting can create a radio map of a given area based on the RSS data from several access points and generates a probability distribution of RSS values for a given (x, y) location. Live RSS values can then be compared to the fingerprint to find the closest match and generate a predicted (x, y) location.

Some wireless location approaches assume that the target device is static rather than mobile. Traditionally, these systems have located essentially fixed items such as laptops sitting on desks for long periods of time. Determining the location of a mobile target entails solving some unique problems. First, small mobile clients do not have omni-directional antennas. Second, the user's body affects the wireless signal's propagation. Having a human body between a transmitting client and a receiving AP can cause a 10 dB loss in signal strength. Finally, these mobile devices have variable transmit power as they try to save battery life. The state-of-the-art static localization calculates the mean over k-nearest neighbors weighted by each location likelihood. For example, the likelihood can be calculated using the following equation:

$$p(z_w^t \mid x_t^i) = \prod_{n=1}^{N} e^{\frac{-\left(z_{w,n}^t - h_{w,n}^{tx_j}\right)^2}{\sigma_w^2}}, \qquad (1)$$

where h is the wireless calibration vector for location $x^i$ and the $n^{th}$ AP.

Implementations described herein utilize a different approach and calculate the most likely path over time. Implementations attempt to solve the body effects and antenna issues by storing multiple feature vectors per location. By allowing multiple calibration measurements per location, the effects of the human body over orientation can be captured. This also allows the system to capture non-linear and non-Gaussian RF characteristics.

Storing multiple measurements per location allows statistical analysis of the stored calibration data to remove old measurements as the RF environment changes over time. A method is needed to find the probability of a target being located at each location across a grid. The probability, $p(x_t^i | p_w (x_{t-1}), z_w^t, \tau)$, of being at location $x^i$, at time t, can be calculated given the probability of being at all locations, x, at time t−1, a RSS measurement from N access points, and a transition probability $\tau$:

$$p(x_t^i | p_w(x_{t-1}), z_w^t, \tau), \qquad (2)$$

where i=1:L and L is the number of grid locations; $\tau_t$ is the transition probabilities at time t; $Z_t$ is the wireless RSS measurement vector.

$$p(x_t^i | z_w^t) \propto p(z_w^t | x_t^i) \tilde{p} x_t^i) \quad (3)$$

The likelihood of receiving feature vector $z_w$ at location $x^i$ is:

$$p(z_w^t | x_t^i) = \prod_{n=1}^{N} e^{-\frac{(z_{w,n}^t - h_{w,n}^{tx_i})^2}{\sigma_w^2}}, \quad (4)$$

where h is the wireless calibration vector for location $x^i$ and the $n^{th}$ AP.

The predicted prior probability $$\tilde{p}(x_t^i) = p(x_t^j | x_{t-1}^j, \tau_t) = \sum_{j=1}^{L} x_{t-1}^j \tau_t^{i,j}, \quad (5)$$

where $\tau_t^{i,j}$ is the transition probability from location j to location i given that $$\sum_{j=1}^{L} \tau_t^{i,j} = 1, \quad (6)$$

and $$\text{if } \begin{matrix} i = (x_i, y_i) \\ j = (x_j, y_j) \end{matrix}, \tau_t^{i,j} = \begin{cases} 0 & \text{if } |x_i - x_j| > 1 \text{ or } |y_i - y_j| > 1 \\ \eta^{i,j} & \text{otherwise} \end{cases} \quad (7)$$

where $\eta^{i,j} = p(x_{t+1}^i | x_t^j, v_t^j)$.

where $\eta^{i,j} = p(x_{t+1}^i | x_t^i, v_t^i)$.

Video Localization Module

In some implementations, video surveillance cameras can be used to track individuals in order to increase the accuracy of a localization system. There are several problems that must be overcome in order to utilize video cameras for such a system. First, the computer vision algorithms to track individuals can be very computationally intensive. Second, tracking people across multiple cameras that are deployed to cover a large area but whose field-of-view also might overlap is an unsolved research problem. Third, in order to maintain consistent target labels during tracking, consistent labels must be maintained through occlusions. To solve these problems, implementations described herein do not to track targets with the goal of providing a definitive target position over time, but instead results in a probability of occupancy over all locations without target labels. Since a target's identity and absolute position are not being tracked, the problems described in the above text can be resolved in a robust way yet still have access to video tracks when they are reliable.

Video Localization Technology

In some implementations, computer vision technology can be utilized to localize an object from a video in 2D space relative to a ground plane. The first step is to find the pixel in an image where the object touches the ground plane. Next this pixel's coordinates are transformed through a ground plane homography to coordinates on a floor plan.

Camera Calibration

In some implementations, each video camera can have its intrinsic and extrinsic parameters calibrated. The intrinsic parameters encompass the focal length, image format, principal point, and lens distortion of the camera. The extrinsic parameters denote the coordinate system transformations from camera coordinates to world coordinates. For example, the world coordinates can be relative to a building floor plan (e.g. floor plan 100).

In some implementations, given a floor plan (e.g., floor plan 100) the extrinsic parameters can be extracted automatically. First, the system can determine where walls of the building meet the ground plane in a captured image. Then, the points in the image where the walls meet the ground plane can be fit to a floor plan to extract the extrinsic parameters.

Monocular Localization

Figure 3:
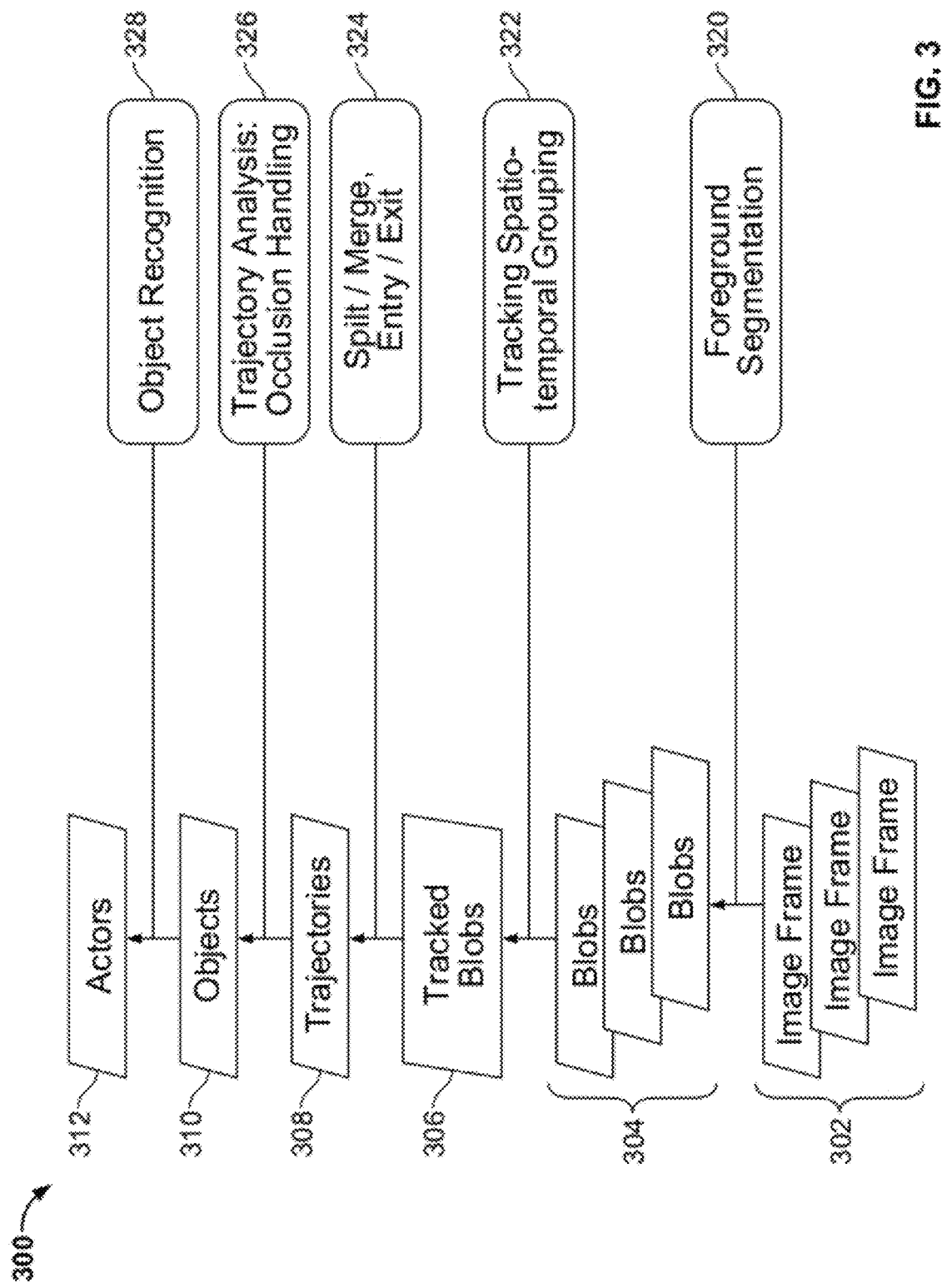
FIG. 3 illustrates an example monocular localization process.

In some implementations, monocular localization uses one camera on a scene in order to detect moving people or objects and, relative to a floor plan, report their locations. FIG. 3 illustrates an example monocular localization process 300. In FIG. 3, a sequence of foreground blobs 304 can be created from image frames 302 by separating the foreground from the background through foreground segmentation 320. With static cameras, foreground segmentation 320 can be performed through background subtraction. Background subtraction involves calculating a reference image, subtracting each new frame from this image, and thresholding the result. The result of thresholding is a binary segmentation of the image, which highlights regions of non-stationary objects. These highlighted regions are called "blobs".

Blobs can be a fragment of an object of interest or they may be two or more objects that are overlapping in the camera's field-of-view. Each of these blobs needs to be tracked 306 and labeled to determine which are associated with objects. This labeling process can be complicated when blobs fragment into smaller blobs, blobs merging, or the object of interest entering or leaving the field-of-view. Blob appearance/disappearance and split/merge events 324 caused by noise, reflections, and shadows can be analyzed to infer trajectories 308. Split and merge techniques 324 can maintain tracking even when the background subtraction is suboptimal.

Tracking people or objects is further complicated when two or more objects 310 overlap within the field-of-view causing an occlusions. Trajectory analysis techniques 326 aim to maintain object tracking through these occlusions. Finally, it is desirable to recognize the object 328 and determine what the object is or, in the case of people tracking, who the person (e.g., actor 312) is. Appearance based models used to identify a person or object can be CPU intensive and are far from robust. Implementations described herein solve the recognition problem associated with camera-based localization. In some implementations, fusing the video trajectories with the Wi-Fi trajectories, the Wi-Fi MAC address can be used to identify the person carrying a Wi-Fi device or the object with a Wi-Fi tag.

Figure 4:
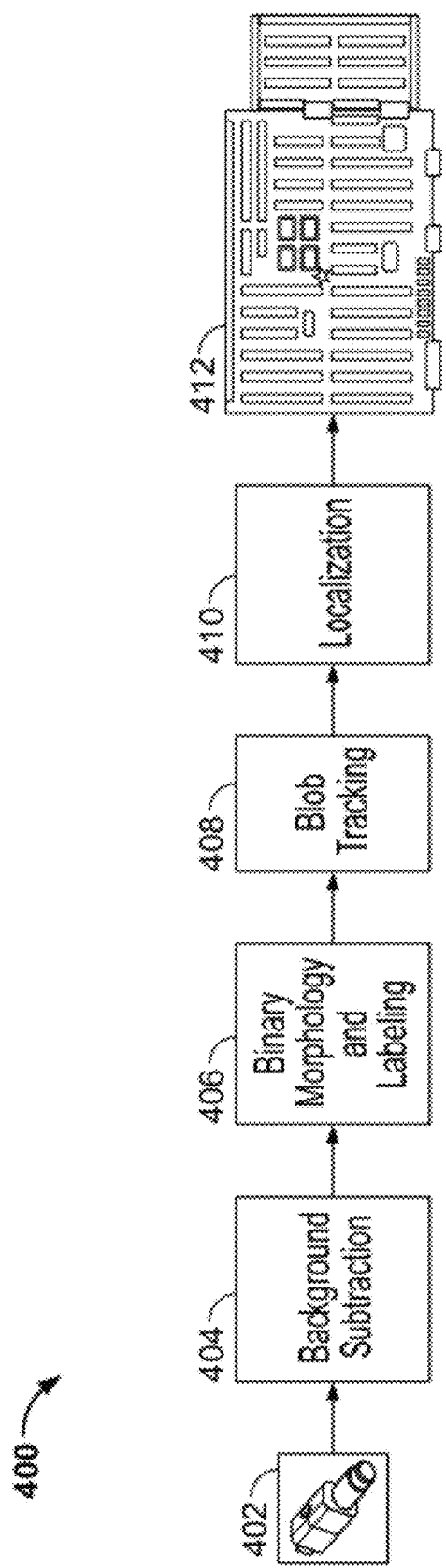
FIG. 4 is a block diagram of an example video localization subsystem.

FIG. 4 is a block diagram of an example video localization subsystem 400. The subsystem 400 can include camera 402, background subtraction 404, binary morphology and labeling 406, blob tracking 408, and localization components 410 for performing video localization within the floor plan 412 of a building.

Background Subtraction

Background subtraction component 404 can perform background subtraction on an image or images captured using camera 402. Segmentation by background subtraction is a useful technique for tracking objects that move frequently against a relatively static background. Although the background changes relatively slowly, it is usually not entirely static. Illumination changes and slight camera movements necessitate updating the background model over time. One approach is to build a simple statistical model for each of the pixels in the image frame. This model can be used to segment the current frame into background and foreground regions. For example, any pixel that does not fit the background model (e.g. for having a value too far from the mean) is assigned to the foreground. Models based on color features often suffer from an inability to separate a true foreground object from the object's shadow or reflection. To overcome this problem the gradient of the frame can be computed. For example, gradient features can be resilient against shadows and reflection.

Binary Morphology and Component Labeling

Binary morphology and labeling component 406 can identify blobs in the foreground region of an image. For example, binary morphology can be used to remove small regions of noise in the foreground image. Once the noise is removed from the foreground, the remaining blobs can be flood filled. During connected component labeling, each blob can be identified, the height and width determined, and the size and centroid location calculated.

Blob Tracking, Object Formation, and Occlusion Handling

Blob tracking component 408 can track blobs as they move in the foreground of an image. Ideally, background subtraction would produce one connected silhouette that completely covers pixels belonging to the foreground object. In practice, background subtraction may not work perfectly for all pixels. For example, moving pixels may go undetected due to partial occlusion or portions of the foreground whose appearance is similar to the background. For example, a foreground silhouette can be fragmented or multiple silhouettes can merge to temporarily create a single silhouette. As a result, blob tracks can be fragmented into components or merged with other tracks. The goal of blob tracking is to merge these fragmented track segments and create distinct, complete tracks for each object. As described below, implementations described herein solve the problem that trajectory-based blob tracking cannot. Trajectory-based blob tracking loses object identity when merged tracks change their trajectory during a merge event.

The primary entity is the "blob," which is defined as being a fragment of an "object" or a group of "objects." The exact nature of the objects is irrelevant; they can be persons, forklifts, etc. It is important to note that a blob acts as a container that can have one or more objects. It is also important to understand that the things being detected, via image processing, and tracked, whether in the absence or presence of occlusions, are blobs, not objects.

Figure 5A:
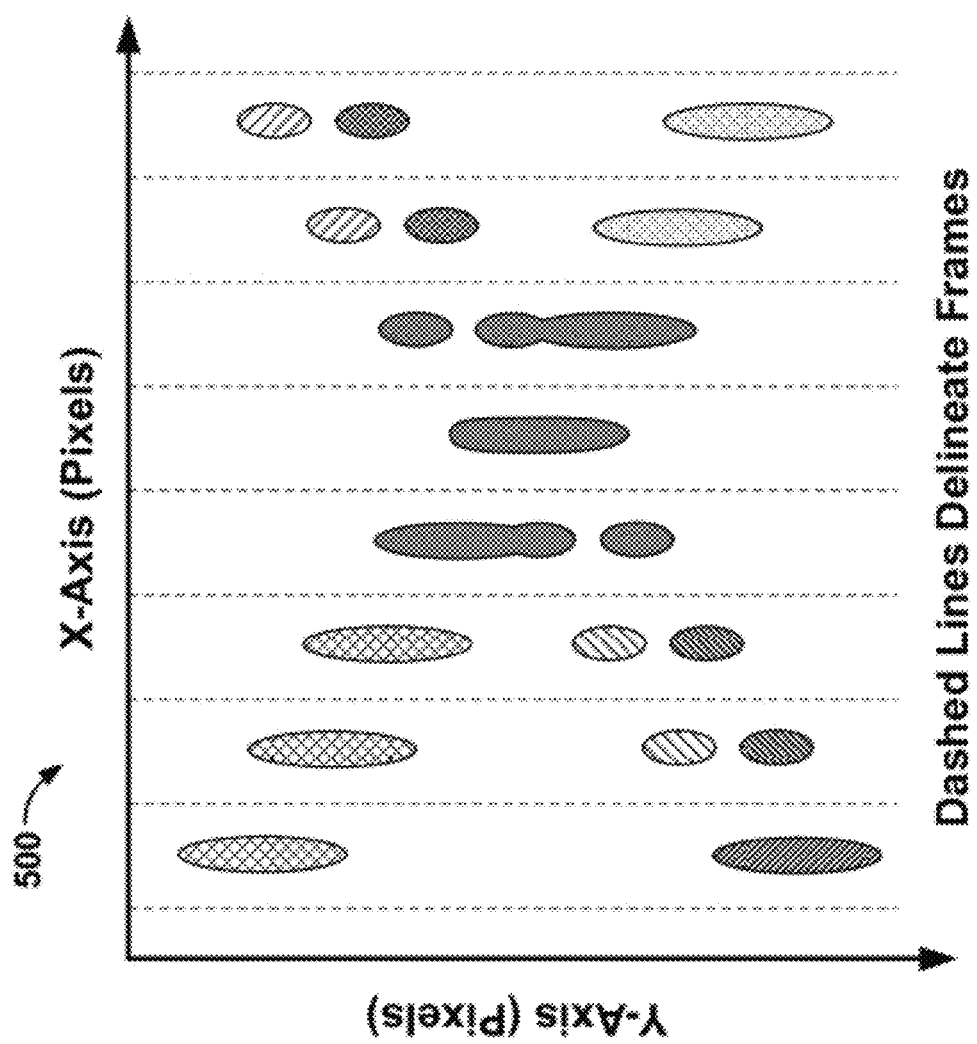
FIG. 5A is a graph that illustrates two objects crossing and a hypothetical set of blobs for those two objects.

FIG. 5A is a graph 500 that illustrates two objects crossing and a hypothetical set of blobs for those two objects over eight frames. One track starts from the upper left origin and moves to the bottom right in image space coordinates. The second track starts in the bottom left and moves to the upper right. This second object splits into two fragments in the second frame. Tracking the objects is further complicated when they cross, occluding each other, forming a group for three frames. Inference graph 550 of FIG. 5B can be generated to stitch together tracks that belong to the same object.

For example, foreground pixel clusters (i.e., blobs) can be tracked until they merge or split. In some implementations, a Kalman tracker can be used to track each blob using a state vector $x=(u,v,N)$, where u is the centroid position of the blob, v is the velocity of the blob, and N is the Gaussian statistics of the blob's spatial location. Each blob's tracker can be updated with each new frame.

Figure 5B:
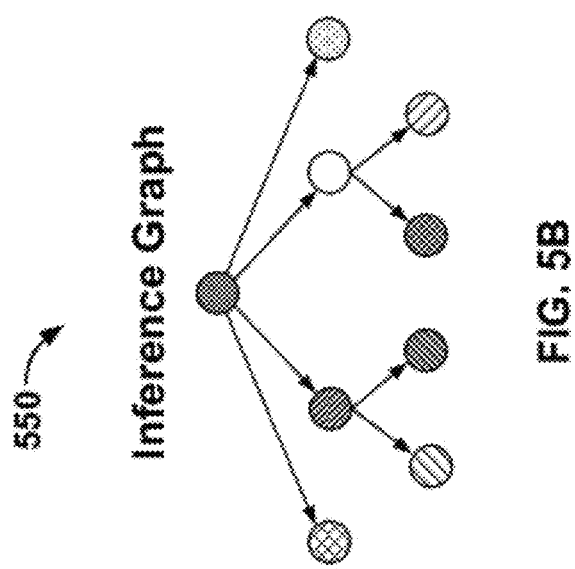
FIG. 5B illustrates an inference graph that is generated from FIG. 5A.

Each tracked blob can be labeled as a fragment, object, or group of objects. To do this, an object model can be created based on spatial locality and coherent motion of constituent parts. FIG. 5B illustrates an inference graph 550 that is generated from the target tracks in graph 500. To generate the inference graph 550, the first step is to record the merge and split events. The inference graph can be generated based on spatial connectedness. For example, for a set of blobs, $B_i$, a graph vertex is created for each blob. For split events, a directed edge is created to the two children vertices. During a merge event, a parent vertex is added and directed edges are added to the merging vertices.

Figure 6A:
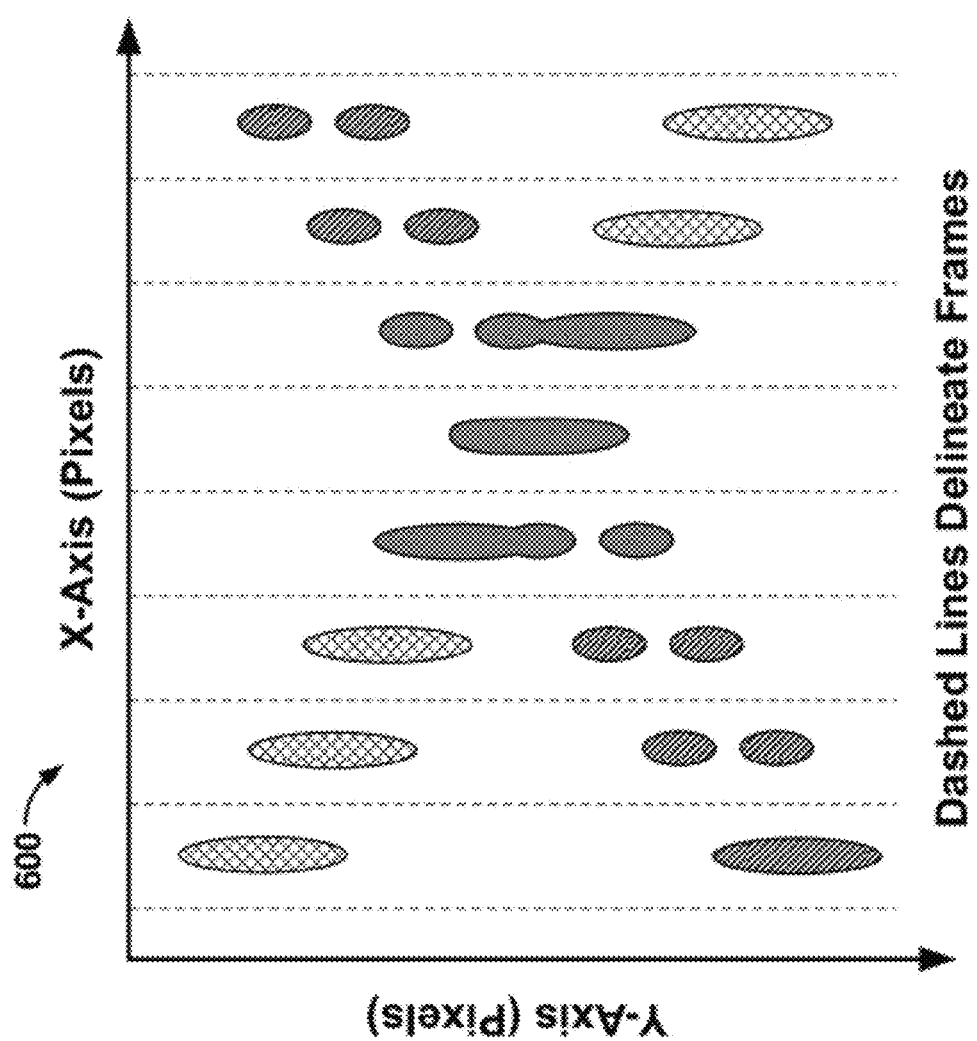
FIG. 6A is a graph that illustrates blobs that are associated with objects and tracks that have been maintained through an occlusion.
Figure 6B:
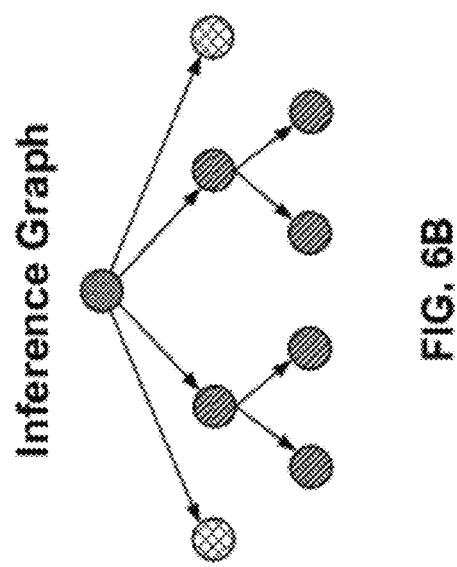
FIG. 6B illustrates an inference graph that is generated from FIG. 6A.

FIG. 6A is a graph 600 that illustrates blobs that are associated with objects and tracks that have been maintained through an occlusion. The algorithm to do this takes the inference graph 550 (FIG. 5B) as an input as well as all the Kalman tracking states for each vertex. First, the nodes are labeled as either fragment, object or group using a coherent motion constraint. The coherent motion constraint implies that any two target blobs from the same object have an average velocity difference vector that has zero-mean Gaussian statistics with a small variance. Furthermore, the velocity difference between two target blobs from different objects will be a Gaussian with zero mean and a large variance. A depth-first search can be used to traverse the graph, in a bottom-up fashion, and stitch together child vertices with parents until the coherent motion constraint is violated. The result is the inference graph 650 of FIG. 6B with fragment, object, and group labels.

At this point, the blob fragments are associated with objects. Next, the tracks before and after the merging occlusion event need to be stitched together. To do this, the Kalman tracker can be used to predict the position of the object after the merging occlusion event. The tracks emerging from the occlusion can be compared to the predicted location of the object and the nearest track can be associated with the object.

A difficulty in tracking through occlusions is reestablishing object identities following a merge/split. The identity of objects that change their trajectories during an occlusion can be lost. Appearance based occlusion resolution methods are processor intensive and are not robust.

Video Localization

Referring to FIG. 4, video localization component 410 can determine the real world location of a target object. The localization process includes two steps. First, the piercing point of each tracked object can be found. The piercing point of an object is the pixel where the object meets the ground plane. For example, the piercing point of a human target is the center point of the target's shoes. The second step is to project the piercing point's pixel coordinates through a ground plane homography transformation. The result is the world coordinates of the target object, typically relative to a floor plan.

Multiple View Tracking: Homography Fusion

Figure 7:
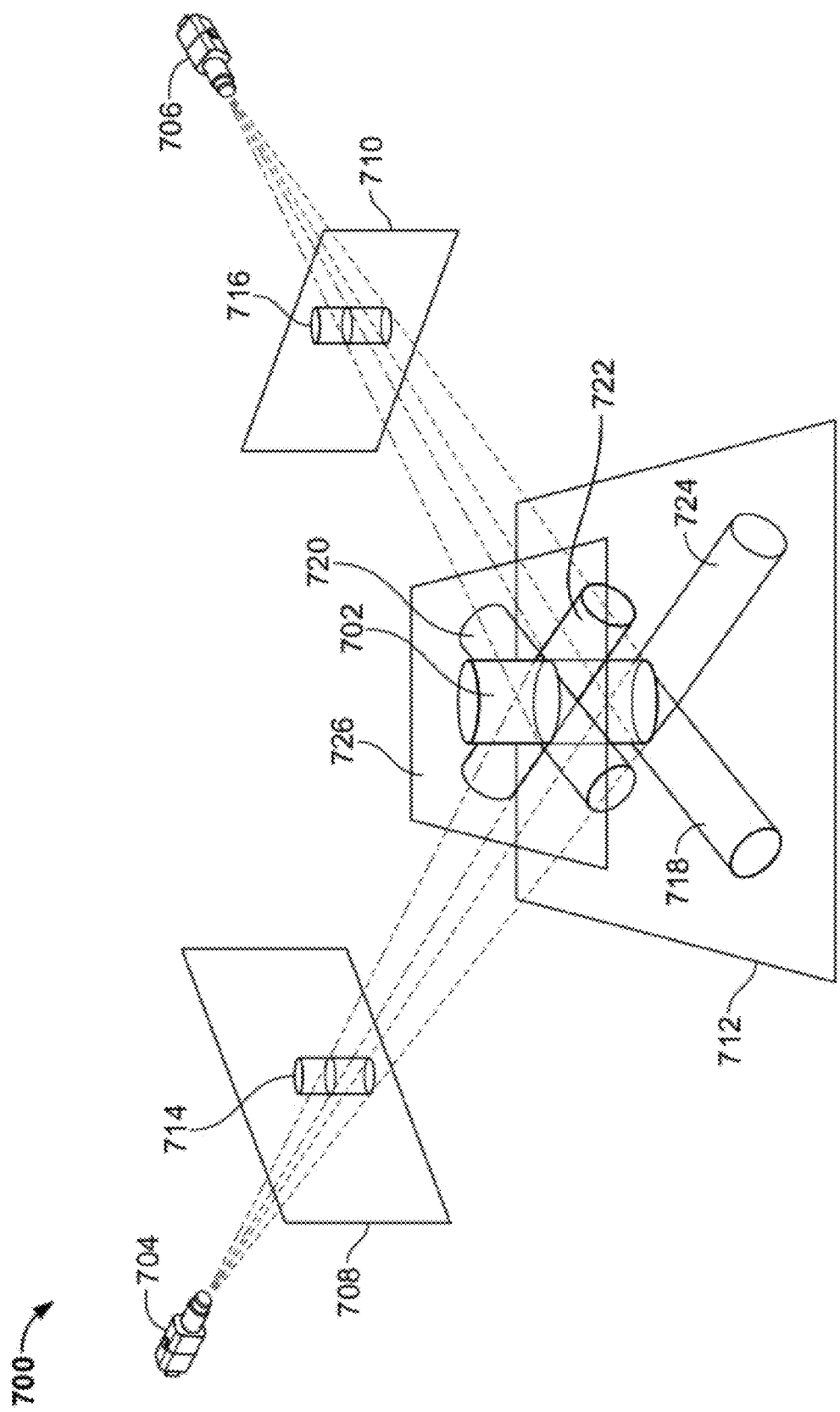
FIG. 7 illustrates an example system for multiple view tracking using multiple cameras.

FIG. 7 illustrates an example system 700 for multiple view tracking using multiple cameras. In some implementations, multiple cameras can give three-dimensional information that can be used to make localization more robust. For example, cylinder 702 can be viewed by cameras 704 and 706. Cylinder 702 can represent a person or object that can be tracked using the multiple camera system, for example. Image planes 708 and 710 for cameras 704 and 706, respectively, are transformed through a ground plane homography projection and fused together on the ground plane 712. The slices of the cylinders 714, 716 on the ground plane 712 overlap in the ground plane homography. However, the other portions of the cylinders are parallaxed during the transform, as shown by the projections 718-724 from the cylinder 702. Likewise, fusing can be performed on planes parallel to the ground plane, as shown plane 726. Multiple view tracking is not processor cycle efficient, as the entire image must be transformed through a homography rather than just the targets' piercing points.

Occupancy Map

Figure 8:
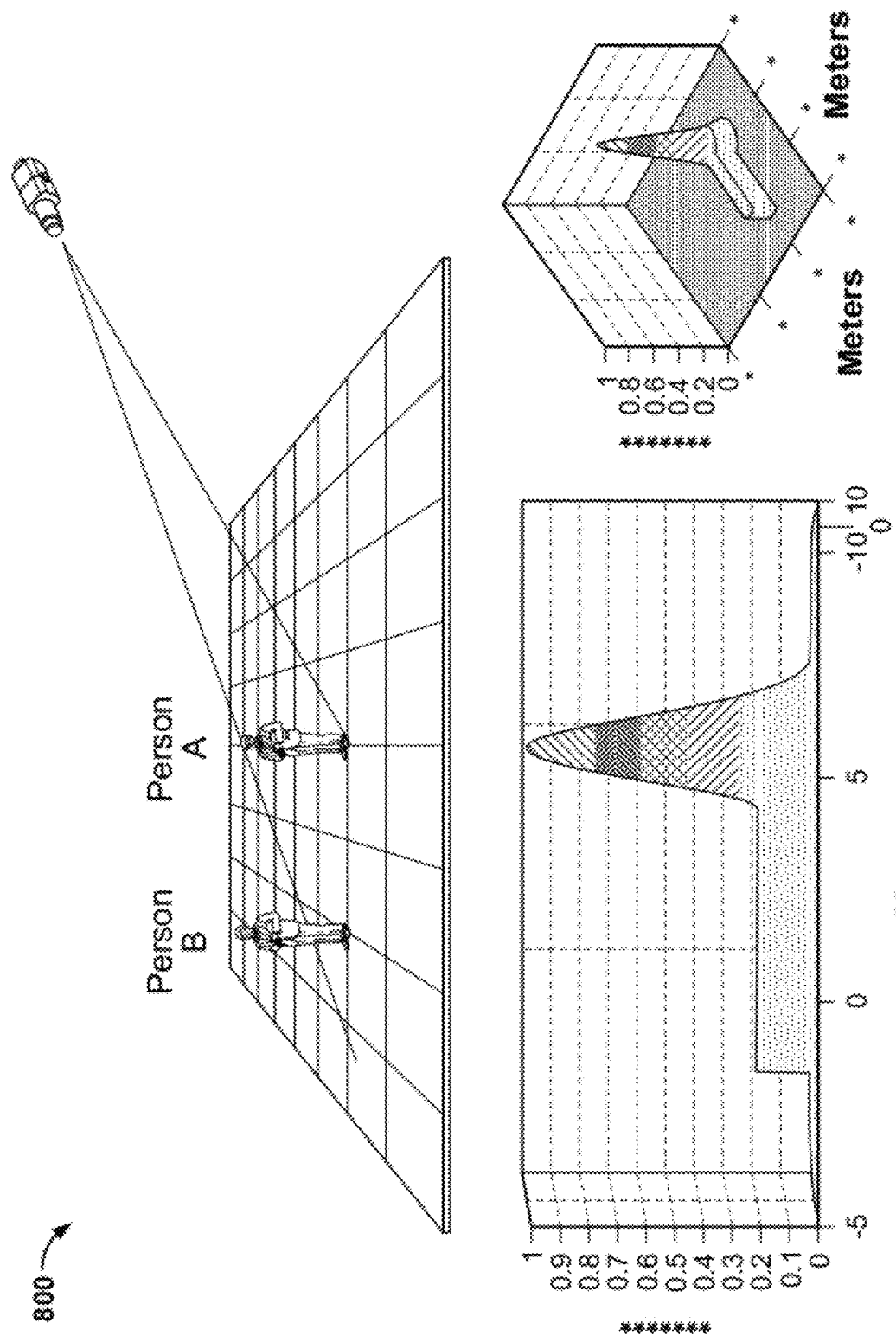
FIG. 8 illustrates an example occupancy map.

FIG. 8 illustrates an example occupancy map 800. The previous section detailed the video localization technology and steps to use video tracking to improve localization. Due to occlusions, it is difficult to maintain consistent track labels even with state-of-the-art technologies. In some implementations, the probability of occupancy can be modeled over a grid to improve localization. An occupancy map can store the probability of each grid cell being either occupied or empty.

In some implementations, the occupancy probability $p_v(x_t^i | I_t^C)$, can be estimated over locations $x_t^i$ given images $I_t^C$ from M cameras, at time t. For example, to find the position of a target, background subtraction, connected components, and blob tracking can be computed in order to find the target blobs' piercing points. A piercing point is the pixel where the blob touches the ground plane. By projecting the piercing point pixel through a ground plane homography, the target's location can be calculated. The probability $p_v(x_t^i | I_t^C)$ can be estimated as $p_v(x_t^i | B_t)$, where $C: \{c_1, c_2 \ldots c_m\}$ for M cameras and $B_t = \{b_t^1, b_t^2 \ldots b_t^M\}$ where $b_t^M$ is the vector of blobs from each camera image.

To calculate $p(x_t^i | b_{t,c}^P)$, occlusions that occur in crowded spaces can be modeled. For example, an occlusion is when one target crosses in front of another or goes behind any structure that blocks the camera's view of a target. This includes when one person closer to a camera blocks the camera's view of another person.

FIG. 8 illustrates a situation where person B cannot be distinguished from person A using a monocular camera blob tracker. The tracker cannot determine whether one or more people are occluded behind person A. This situation can be modeled probabilistically by a Gaussian distribution curve centered at the piercing point of the person closest to the camera and a uniform probability extending from the Gaussian distribution curve to the point where the blob's top pixel pierces the ground plane.

The instantaneous probability of occupancy at location $x^i$ is modeled as a Gaussian distribution centered at the blob's lower piercing point. The variance of the Gaussian distribution is proportional to the distance between $x^i$ and the camera location.

$$p(x_t^i | b_{t,c}^P) = e^{\frac{-\|x_t^i - \text{location}(b_{t,c}^P)\|^2}{\sigma_{b_{t,c}^P}^2}} \quad \text{and} \tag{8}$$

$$\sigma_{b_{t,c}^P} = \frac{|\text{location}(c) - \text{location}(b_{t,c}^P)|}{20} + 0.5 \tag{9}$$

An example demonstrating the creation of an occupancy grid is illustrated in FIGS. 10A-10F. The camera images (FIGS. 10A-10C) show three cameras covering a scene with six people. The cameras have both overlapping and non-overlapping regions, as illustrated by FIG. 9. For example, the camera images of FIGS. 10A-10C can correspond to the images captured by cameras 902-906 of FIG. 9. FIGS. 10D-10F illustrate occupancy grids generated based on the images of FIGS. 10A-10C.

Figure 11:
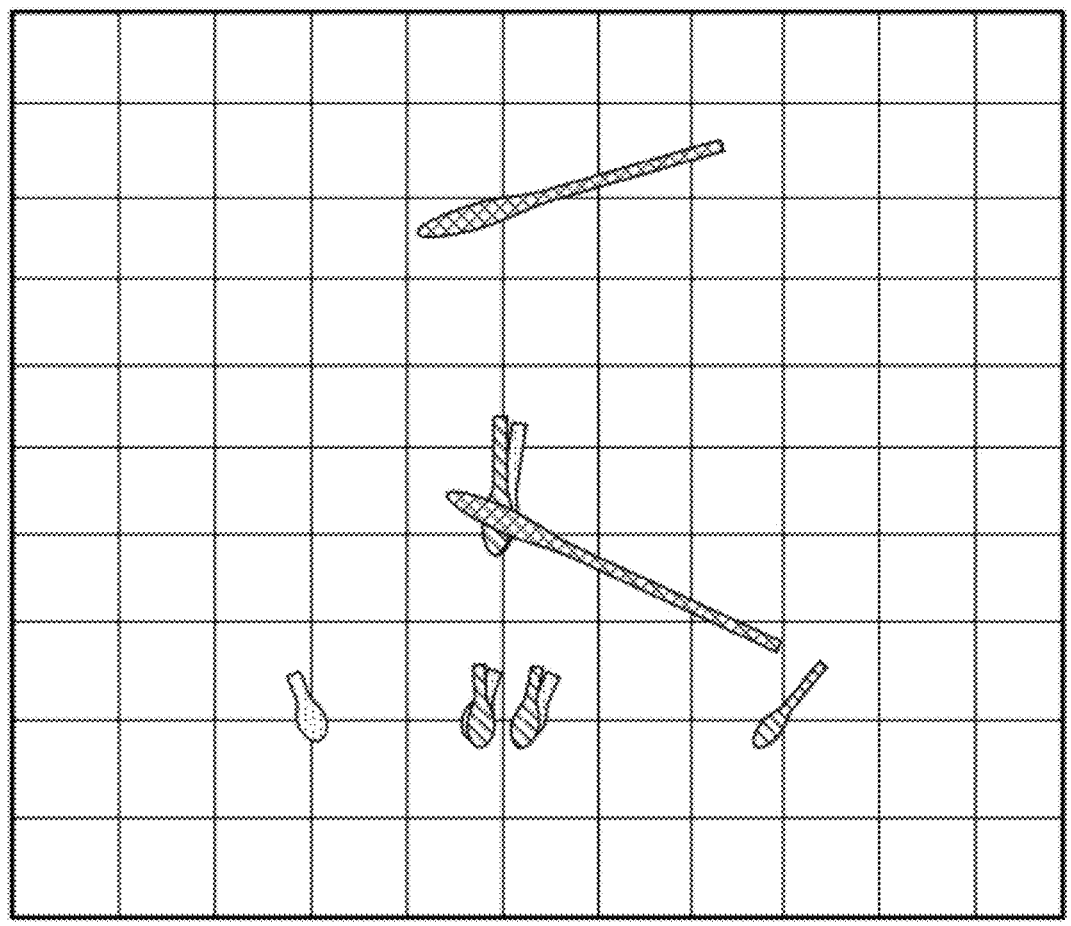
FIG. 11 illustrates an example combined occupancy grid generated by combining the occupancy maps of FIGS. 10D-10F.

In some implementations, multiple blobs across multiple cameras can be fused together using the following equation:

$$p_v(x_t^i | B_t) = \max_{c=1:M} \left( \max_{p=1:Q_C} (p(x_t^i | b_{t,c}^P)) \right), \tag{10}$$

where $Q_C$ is the number of blobs in camera C at time t. Other methods to combine multiple occupancy grids include the summation or product of occupancy probability grids from different cameras. FIG. 11 illustrates an example combined occupancy grid 1100 generated by combining the occupancy maps of FIGS. 10D-10F.

In an implementation, Bayesian filtering can be used to compute a posterior occupancy probability conditioned on the instantaneous occupancy probability measurement and velocity measured for each grid location. A prediction step can be used to compute a predicted prior distribution for the Bayesian filter. For example, the state of the system is given by the occupancy probability and velocity for each grid cell. The estimate of the posterior occupancy grid will include the velocity estimation in the prediction step. For each grid cell in the Bayesian occupancy filter, the set of velocities that brings a set of corresponding grid cells in the previous time step to the current grid are considered. The resulting distribution on the velocity of the current grid cell is updated by conditioning on the incoming velocities with respect to the current grid cell and on the measurements from the cameras.

Improving Occupancy Models With Architectural Constraints

The probability of occupancy models can be improved by measuring the height of the blobs. For example, ground plane homography as well as a homography at head level can be performed. Choosing the head level homography height as the average human height, 5'9", a blob can be declared short, average, or tall. For example, a failure in the background subtraction might result in a person's pants not being detected resulting in a short blob. A tall example results when two people aligned coaxially with the camera form one blob in the camera's field-of-view. The height of each blob is one piece of information that is used to improve the probability occupancy models, as described further below.

The architecture of the space seen by the camera also can be used to improve the probability occupancy models. For example, a wall or shelf can constrain the occupancy probability to one side of the wall or shelf. Likewise, observing a person within an aisle can constrain them to that aisle. The probability model can be selected based on the type of space and the blob's relative height. For example, the probability model can be selected based on whether the blob tall or short.

The probability model can be selected based on whether the blob is in open space, partially obscured behind a wall, or between walls. The probability model can be selected based on the heights of different objects proximate to the detected blobs.

Human Detection

For applications tracking human or other objects with specific appearance, computer vision detection methods can be used to help resolve occlusions. One method is histogram of gradient feature extraction used in conjunction with a classifier such a support vector machine. The speed of these methods can be improved by performing detection only over the blobs from background subtraction rather than the entire frame. Detectors improve the occupancy map by replacing uniform probabilities over the region of an occlusion with Gaussians at specific locations.

Depth Cameras

Creating an occupancy map from a depth camera such a stereo camera is simpler than using a monocular camera. Monocular cameras suffer from occlusion ambiguity. The depth camera may resolve this ambiguity. For each pixel a depth camera report the distance of that pixel from the camera. In one embodiment of this disclosure, the occupancy map can be created from depth camera measurements, with each detection modeled as a 2D Gaussian.

In conclusion, probability occupancy models have advantages including providing a probabilistic approach to occlusion handling, easily combining multiple cameras, and computational efficiency.

Multi-View Geometry

In some implementations, if a target is in the field-of-view of two monocular cameras, those two camera views can be used to compute the 3D coordinate of the target. For example, similar to a stereo camera, multi-view geometry uses two or more cameras to compute a distance to the target using epipolar geometry.

Traditionally, multi-view or stereo systems are very computationally expensive. The calculations can be simplified, however, with a few assumptions. For example, three steps are required for computing an epipolar geometry. First, corresponding points must be found between the images. Second, the camera view may be rectified. Finally, a transformation to the world coordinate system is performed. To address these three performance concerns, an assumption can be made that the top of the head of a blob is the correspondence point without trying to achieve pixel-level accuracy. Next, the rectification and transformation processes are only performed for one pixel to calculate one 3D coordinate.

Wireless Localization Enhancement

Transition Probability and Motion Models

The vision probability occupancy map and blobs' velocity are inputs to the wireless localization module. These inputs improve the precision and accuracy of the Wi-Fi localization. The vision probability occupancy map as well as the velocity of blobs set the Wi-Fi transition probabilities for each grid location. This has two effects. First, the Wi-Fi localization calculations are more accurate as the calculations are limited to locations with non-zero probability specified by the vision localization module. Second, the blobs' velocity is a local motion model for the Wi-Fi localization calculations.

Correlation of Wi-Fi Tracks and Vision Tracklets

Although it is not practical to expect computer vision to track a person's motion unbroken through occlusions, even tracking over short segments (i.e., tracklets) is useful. In a probabilistic framework the correlation between a Wi-Fi track and vision tracklet is prior information that improves the Wi-Fi likelihood calculations.

To accomplish this association, the trajectories of Wi-Fi devices and the trajectories from the video camera network can be spatio-temporally correlated. A trajectory is the path a moving object takes through space over time. Using the parlance of multiple target tracking, each of these trajectories is a track. During the spatio-temporal correlation, each Wi-Fi track can be correlated with each video track in order to determine how similar each pair of trajectories are. This process relies on the fact that one object's location, measured two different ways, even when the measurements have different observation error statistics, should move coherently through time.

The first step is to define a similarity measure between two tracks. For example, a similarity measure can include $L_p$ norms, time warping, longest common subsequence (LCSS), or deformable Markov model templates, among others. In some implementations, the $L_2$ norm can be used as a similarity measure. The $L_p$ norm is defined as $$L_p(v, w) = \left( \sum_{i=1|v_i-w_i|}^{n} p \right)^{1/p}, \qquad (11)$$

where v is a vector of the (x,y) position from the video localization and w is a vector of the (x,y) position from the Wi-Fi localization. For the Euclidean norm, p equals two. The Euclidean norm will find the similarity between the track v and the track w over a time series of data. For a real-time system it may be necessary to have an iterative algorithm that will update the similarity between tracks at every time sample without needing to store the entire track history, as described below and framed as a Bayesian inference graph.

Figure 12B:
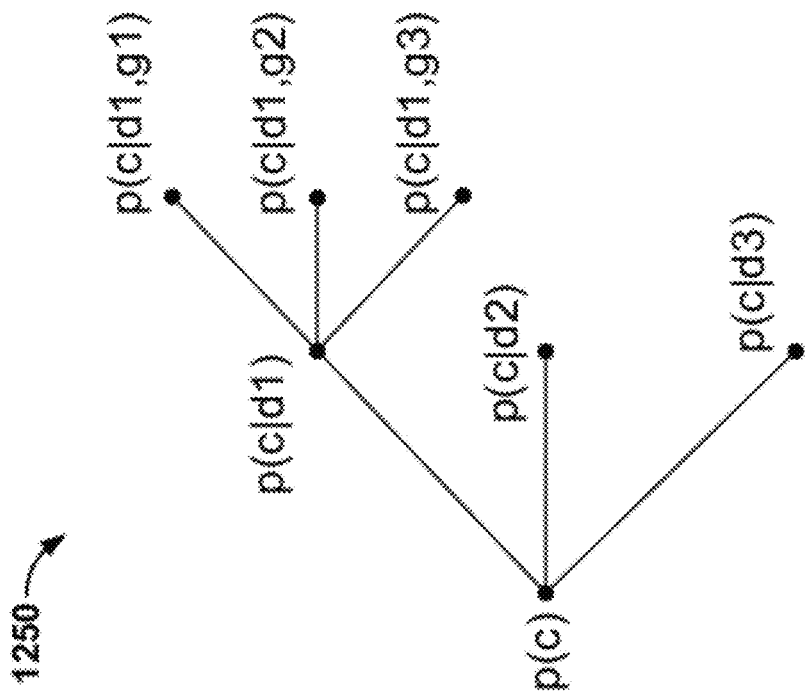
FIG. 12B illustrates an example inference graph where the Wi-Fi system reports a probability associated with each map grid.
Figure 12A:
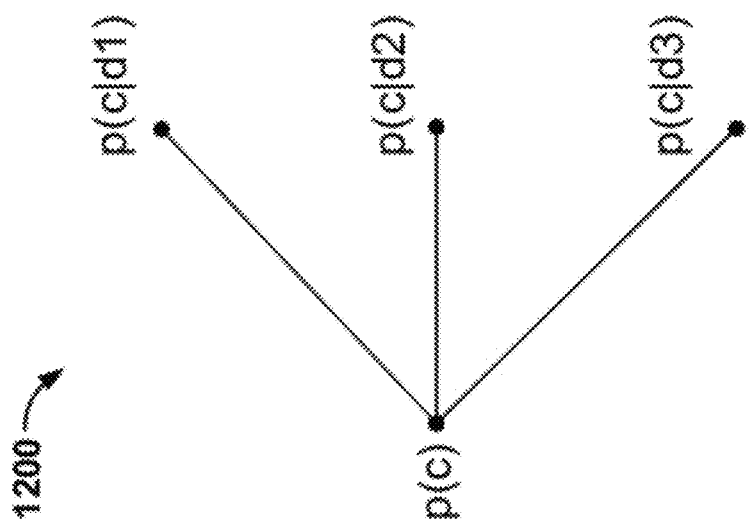
FIG. 12A illustrates an example inference graph for a video track.

FIG. 12A illustrates an example inference graph 1200 for a video track. The leaves of the graph are the probability that a Wi-Fi device is associated with a particular camera track given a new observation. The top leaf, p(c|d1), is the probability that Wi-Fi device, with error vector d1, is associated with this camera track given the new error vector d1. FIG. 12B illustrates an example inference graph 1250 where the Wi-Fi system reports a probability associated with each map grid. In this case the top leaf, p(c|d1,g1), is the probability that Wi-Fi device, with error vector d1, is associated with this camera track given the new error vector d1 at grid map g1. This framework can allow new measurements to iteratively improve the association probability estimates.

Fusion Module

The Wi-Fi likelihood and vision probability of occupancy are fused together using Bayesian inference to advance the target location through time.

$$p(x_t^i|I_t, z_{w_t}, x_{t-1}) \propto p(x_t^i|I_t^C) p(x_t^i|z_{w_t}) p(\tilde{x}_t^i|x_{t-1}^i) \qquad (12)$$

The probability of the target's position being at $x^i$ given images from each camera, the target's wireless measurement, and the previous grid probabilities equals the product of the vision grid probabilities, Wi-Fi grid probabilities, and predicted prior grid probabilities. The target's position is the state estimate of the system and may be computed in many ways: as the expectation over the grid, the maximum probability across the grid, or the average of k-largest probabilities. In one embodiment the state estimate's velocity is used to compute the predicted prior.

Other Filter Embodiments

Implementations described herein utilize a grid filter for localization. However, other filters (e.g., histogram, particle filters, etc.) may be used to approximate the grid filter.

Wireless AP and Camera Combination

Figure 13:
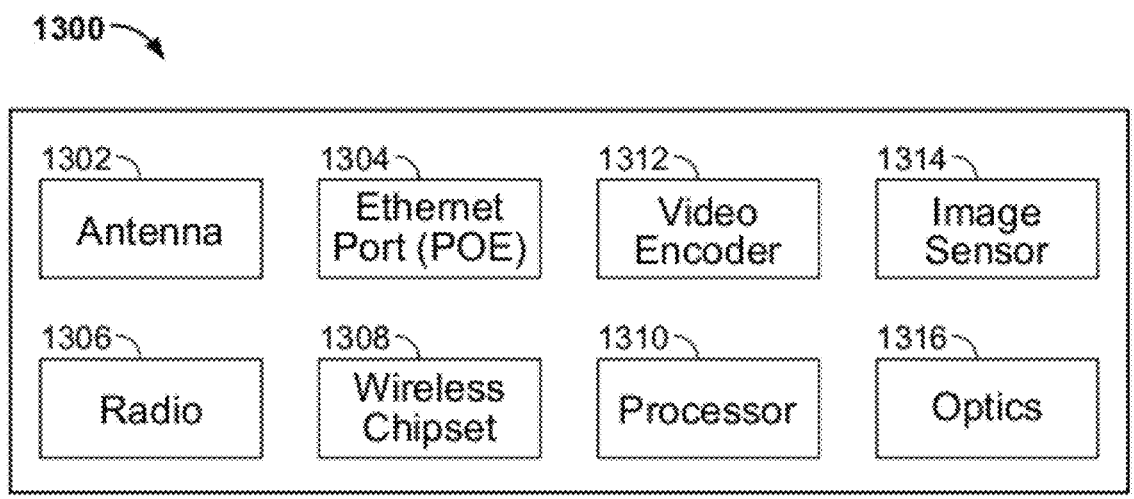
FIG. 13 illustrates an access point (AP)/Camera combination system.

FIG. 13 illustrates an AP/Camera combination system 1300. An RF access point that has an integrated camera has many advantages. First, provisioning APs and cameras can be expensive. One way to reduce the installation cost is to provision one piece of hardware that includes both the Wi-Fi radio and the video camera. Second, TDOA systems require the location of all APs. The installation process often does not precisely locate the APs. This can result in geometric dilution of precision in a TDOA system.

In some implementations, device 1300 can include wireless access point subsystems. The wireless access point subsystems can include an antenna 1302, RF radio 1306, wireless chipset 1308, and microprocessor 1310. Device 1300 can include video subsystems. The video subsystems can include lens optics 1316, image sensor 1314, and a video encoder 1312.

Figure 14:
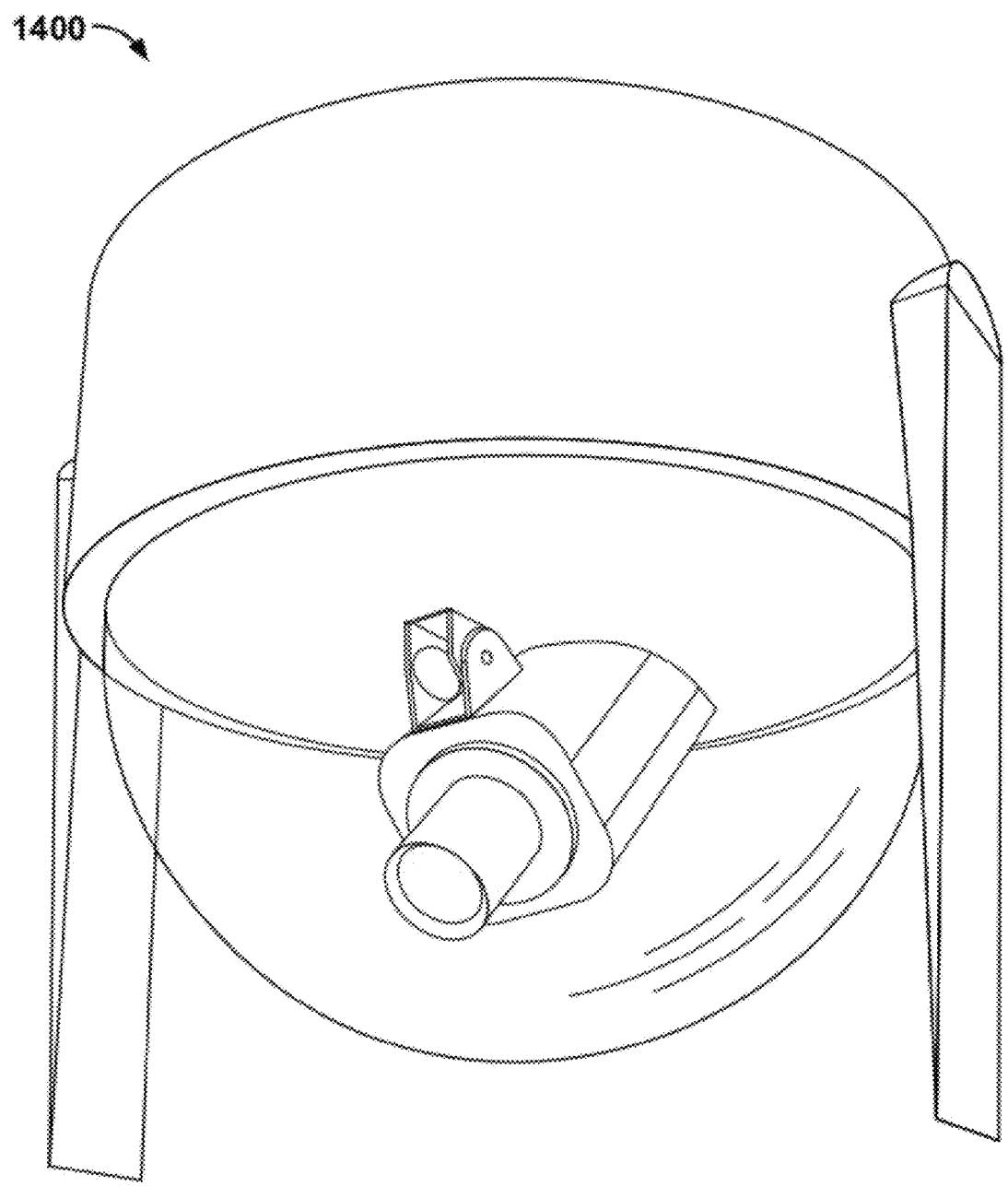
FIG. 14 illustrates an example AP Camera combination device.

FIG. 14 illustrates an example AP Camera combination device 1400. The device 1400 can have one or more internal or external antennas for the wireless access point. The video subsystem can have a fixed lens, gimbaled lens, or a PVT steerable lens. Device 1400 can have an integrated dome or an exposed camera.

Analytic path loss and TDOA location systems require the accurate location of the access points. In one embodiment of this disclosure, a LED (light emitting diode) can be attached to the AP/camera combination device 1400. The LED can be modulated with an identifying sequence that can be used to identify the device to which the LED is attached. Other cameras can detect the LEDs and can report the location of the APs associated with the detected LEDs.

In some implementations, the video camera identifies architectural features to self-calibrate the extrinsic parameters of the camera and calculate its location. First, it identifies architectural features such as walls and corners. Next, it finds the corresponding ground plane intersections of these features and extracts lines. These lines are matched to a floor plan CAD drawing. Finally, the system self-calibrates the extrinsic parameters of the camera using corresponding features between the camera image and the floor plan map. From the extrinsic parameters the camera position is calculated.

Example Applications

Implementations described herein can be used to provide real-time indoor location tracking solutions for highly mobile client populations, leveraging Wi-Fi infrastructure and video analytics. Taking advantage of enterprise trends towards multi-mode client devices, pervasive WLAN coverage, and video camera deployments. Implementations can provide rich location-aware applications that enable a whole new array of revenue generating and cost reducing solutions.

A challenge with indoor location is providing a system that is accurate, real-time, and financially feasible. Some solutions in the marketplace try to solve indoor-based location including RFID, Bluetooth, zigbee, etc., but most of these are only viable in niche application scenarios. Enterprise organizations need solutions that traverse all of their disparate locations, work for all classes of devices, and are enabled throughout their network. For many of these other technologies to support this requirement, they need to deploy new infrastructure which brings the cost of the location solution to an unfeasible level. For this reason, Wi-Fi is looked upon as the viable solution for indoor location tracking. Most enterprises have already (or are in process of) deployed pervasive Wi-Fi coverage, often using network access as the main business driver for the infrastructure cost. The problem with Wi-Fi however, is that the technology was developed with its focus on efficiently passing traffic, not conserving power or providing location accuracy. Add in the mix a highly mobile user population, and most Wi-Fi location systems do not provide accurate location determinations.

Implementations described herein can overcome these challenges by developing technology that enables accurate tracking using Wi-Fi by incorporating video analytics into the tracking process. Leveraging traditional IP cameras, that most organizations are already deploying for security and asset protection, implementations can merge information from Wi-Fi associations and video streams in order to present a highly accurate and timely location result.

Warehouse Location Based Picking

In a distribution center, efficiency is key and finding ways to shave pennies off of processes can translate into significant enterprise savings. To this end many retailers and manufacturers are attempting to move to a "waveless" picking process where "pickers" (employees responsible for retrieving items in the distribution center for processing to end customers or for shipment to the store) have optimized routes so that the least amount of manpower is used to move items from the warehouse shelf to the packaging area. Unfortunately waveless picking is often a "black-box" process and once the list of picks is created, it is almost impossible to change until the job is entirely completed. Retailers need flexibility in their picking process as often times there are misqueues (items out of stock, too many picked, not enough picked, etc.) and the retailer needs the ability to "pick to order" to deliver items when there is a back up or a rush. Implementations described herein can be used to track the location of the pickers throughout the distribution center enabling the retailer to develop a truly waveless picking process where each next pick is dynamically generated based on the priority of the item and the real-time location of the picker.

Figure 15:
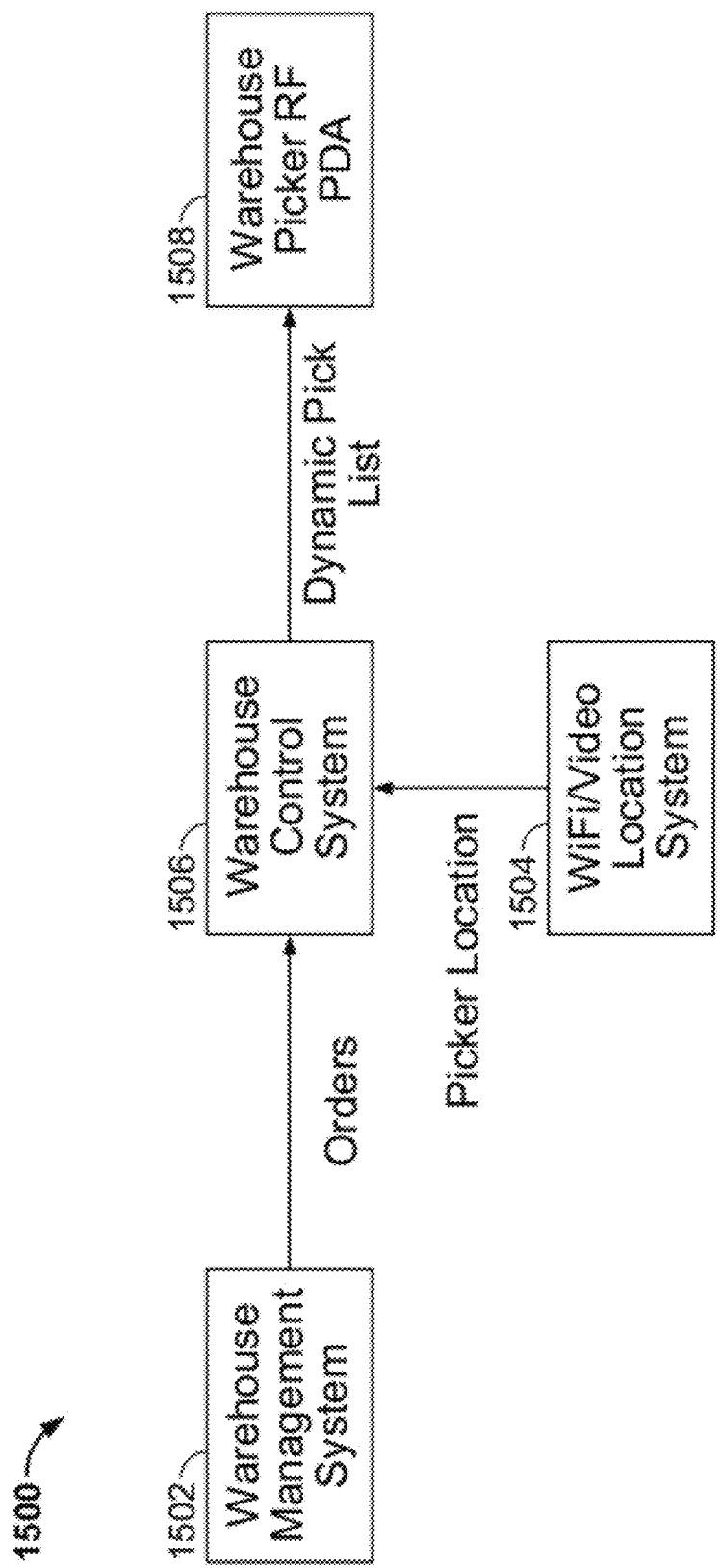
FIG. 15 illustrates an example system for warehouse location-based picking.

FIG. 15 illustrates an example system 1500 for warehouse location-based picking For example, warehouse management system 1502 can receive customer orders and provide the orders to warehouse control system 1506. Location system 1504 can determine picker locations within the warehouse and provide the picker locations to warehouse control system 1506. Warehouse control system 1506 can dynamically generate a picklist that can result in the efficient collection of the items in the customer order based on the current locations of pickers. Once the picklist is generated, the picklist can be transmitted from warehouse control system 1506 to a warehouse picker mobile device 1508 so that the picker can collect the ordered items. Thus, the list of "next picks", traditional in the wave based picking process, can be dynamically updated by any change in the business such as the need to get an item immediately. The ability of the retailer to marry the efficiency of waveless picking and the immediacy and flexibility of pick to order is made possible by the real-time location capabilities described herein.

In-Store Mobile Shopping

Market Landscape

Brick and mortar retailers are undergoing a major transformation as they deal with the changing shopping landscape. The effectiveness of traditional print advertising is steadily declining, forcing retailers to search for new mediums to both attract consumers into the stores as well as promote purchases once they are there. Internet retailers have a significant cost structure advantage and can offer the consumer a truly personalized shopping experience. These issues are driving traditional retailers to rethink their multi-channel strategies and how they leverage and differentiate with their physical world advantages—instantaneous gratification, touch and feel of products, and person-to-person interaction via their sales staff. Finally, one of the most profitable market segments for retailers—those earning six figure salaries, college educated, multiple children, 30-40 years of age—are using their mobile devices to aid their shopping experience. The worst possible scenario for a brick and mortar retailer is where one of these consumers enters their store, chooses the product they want to buy based on seeing and touching it, consults with the retailer's sales person and then decides to buy the item at Amazon.com from their phone. Implementations described herein can enable the brick and mortar retailers to leapfrog their online competitors by providing a mobile shopping environment, which leverages the best of their multiple sales channels.

The Retail System

According to implementations, a retailer can implement a secure "guest" Wi-Fi network utilizing the same wireless LAN infrastructure that the retailer has already deployed for back office functions like inventory tracking, POS, and secure corporate network access. When the retailer's customers enter a store they may notice signage offering "free Wi-Fi" in the store—since most big-box retailers have poor cellular coverage within their buildings, having high speed internet access is a valuable offering for those smart phone users who need to be connected. The first time the customer connects to the Wi-Fi network they will be asked to sign up for the service (e.g., via a captive portal) and provide some form of information that will allow the retailer to identify them (loyalty card number, internet user name and password, mobile phone number, etc.) After this one-time setup process, each time the customer comes in any store, they will automatically connect to the network and the retailer will be identified to their presence within the store.

The retail system is then able to track the location of the customer based on a combination of Wi-Fi location and integration with the in-store video surveillance system, as described with respect to various implementations described herein. In some implementations, the Wi-Fi network can give an approximate location of the customer (usually within 10 m) and then the system can overlay real-time video data to perform a more exact approximation, getting accuracy down to the aisle the customer is standing in. This precise location data within the store can enable location-based services on many mobile applications.

In some implementations, an appliance can be deployed in each retail location that will act as the captive portal and integrate with the in-store Wi-Fi network and video surveillance systems. In some implementations, a mobile applications platform can be deployed in the "cloud" which can integrate with the retailer's back-end systems (loyalty, CRM, POS, etc.) and the in-store appliance to enable rich in-store mobile applications.

The applications will focus on improving the in-store shopping experience, providing self-service features, enabling interactions with store associates, and delivering location specific promotions. In some implementations, applications modules can be provided which can have all of the relevant customer information, location data, and store systems integration. The retailer will then be able to brand these applications and insert them into their existing mobile applications and web site, creating a retailer branded and controlled shopping experience.

Figure 16:
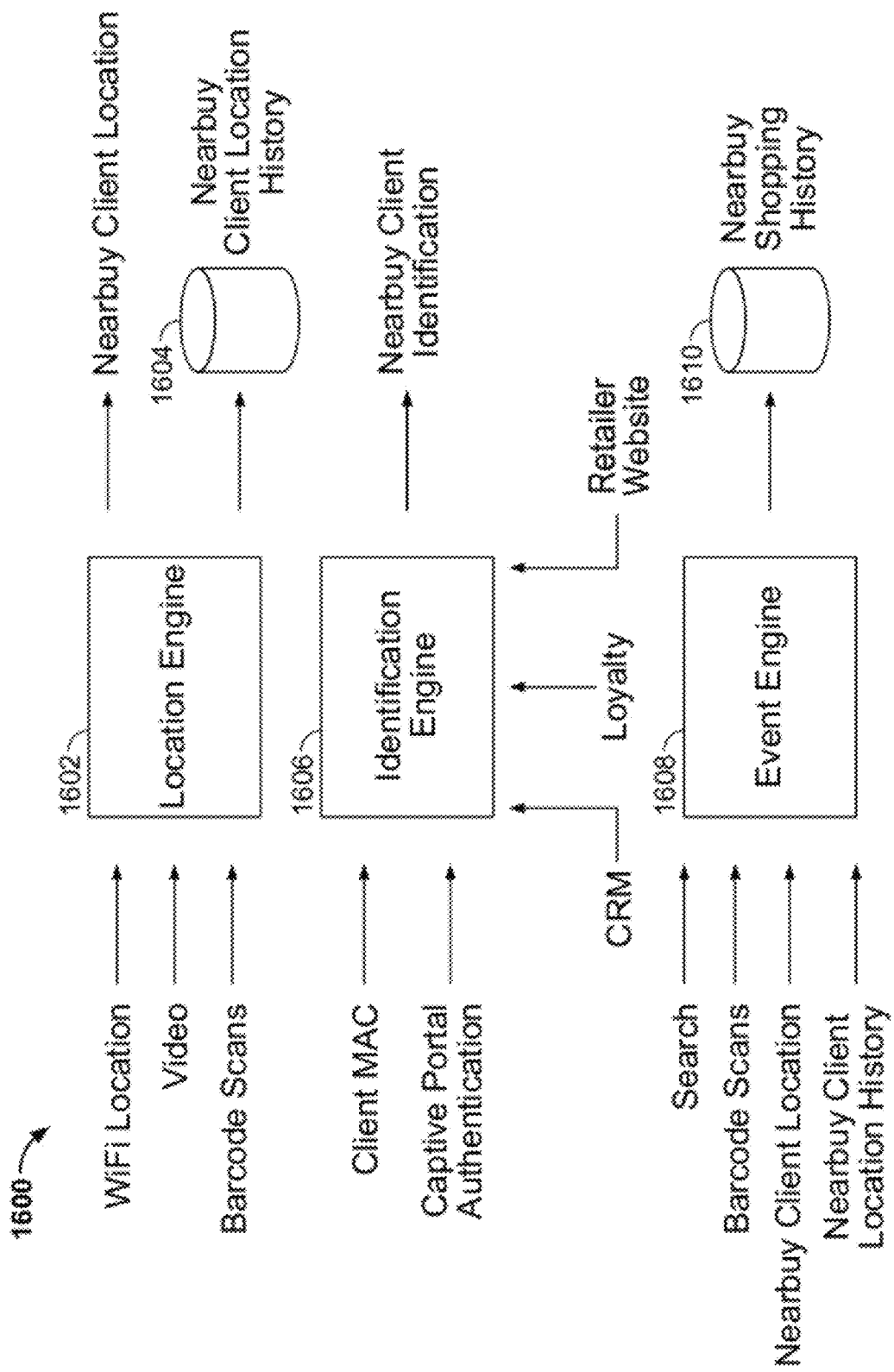
FIG. 16 illustrates an example retail system.

FIG. 16 illustrates an example retail system 1600. System 1600 can include a mobile personalization engine (MPE). The MPE can generate information that can be re-used in shopping application scenarios. The MPE can generate client location information using location engine 1602. The client location can be calculated by the location engine 1602 using the techniques described herein according to various implementations and can provide a near real-time and highly accurate location of the consumer. For example, location engine 1602 can use information, such as a Wi-Fi location data, video data, barcode scans, etc., and determine a client location. The client location information generated by location engine 1602 can be stored in database 1604 as client location history data. The client location history is the saved historical data of the client location information.

The MPE can generate client identification information using identification engine 1606. For example, identification engine 1606 can generate client identification information using the consumer's mobile device MAC address, the information they provided when registering for the Wi-Fi service via the captive portal (loyalty card information, Internet username and password, etc.) and any history the retailer has on this user from the CRM, loyalty card or internet website. The MPE can include event engine 1608 which can generate shopping history information based on the consumers current location, historical location for that shopping experience and then any actions the consumer has done within the retailer's mobile application on the current trip, including scanning a barcode or searching for products. The shopping history information can be stored in database 1610.

Mobile Search

Figure 17:
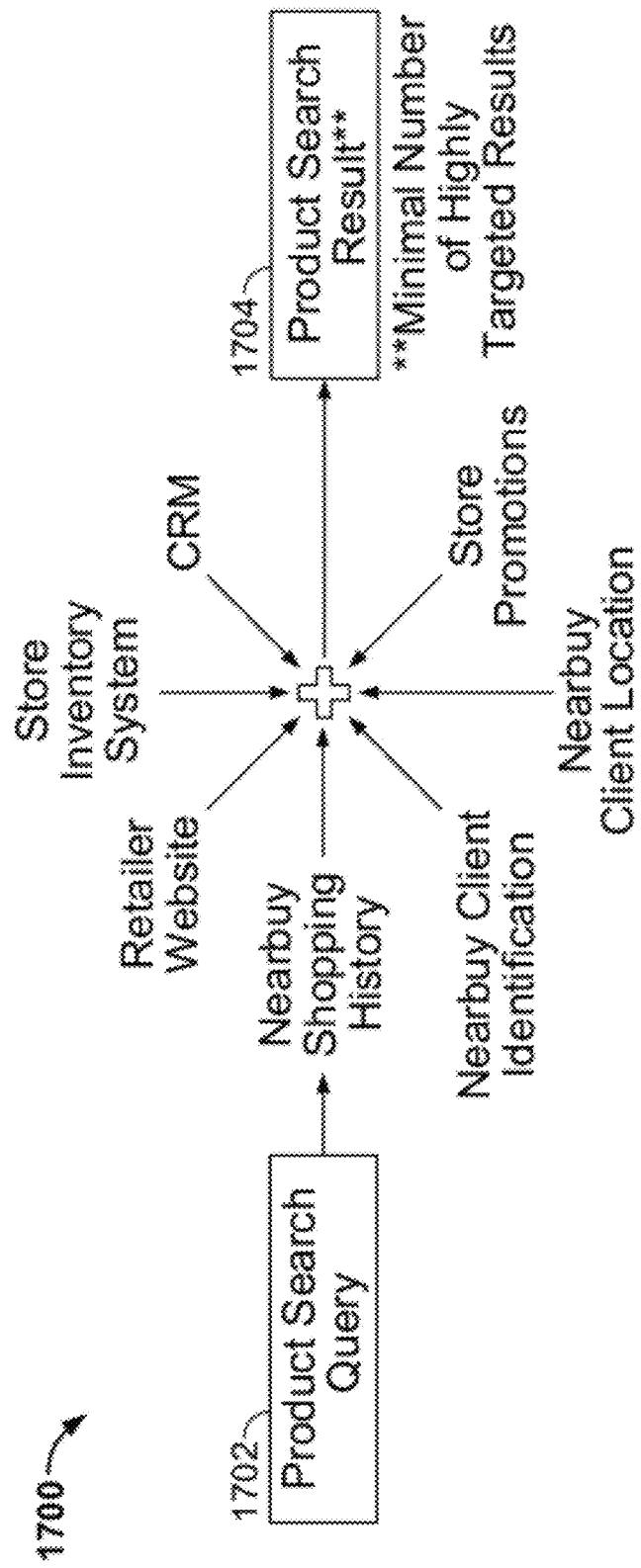
FIG. 17 illustrates an example system for performing a mobile search.

FIG. 17 illustrates an example system 1700 for performing a mobile search. For example, upon entering a store, the consumer can open the retailer's mobile application on their smart phone which can be connected to the retailer's WLAN and provide a product search query 1702 by typing a description in a dialogue box, such as "bike". A mobile search algorithm can take into account retailer specific information and client location information to generate a result that is targeted and meaningful to the consumer. The system can pass the consumer's identification to the retailer's Internet website and conduct a web based search, cross reference those results with items that are within the local store's inventory, add weighting to those items that are on the local store promotion list, and add additional weighting based on personalization information from the retailer's CRM system. Added to this ranked weighted search results, the system will take into account the current location of the consumer and add a weighting to items that are close by, and then also take into account other areas where the consumer has already gone in the store and also weight items that they have passed by. The final result will be a mobile location-based search result 1704 which will pass a few items (less than 10) back to the consumer's phone via the retailer mobile application.

Mobile Product Information

Figure 18:
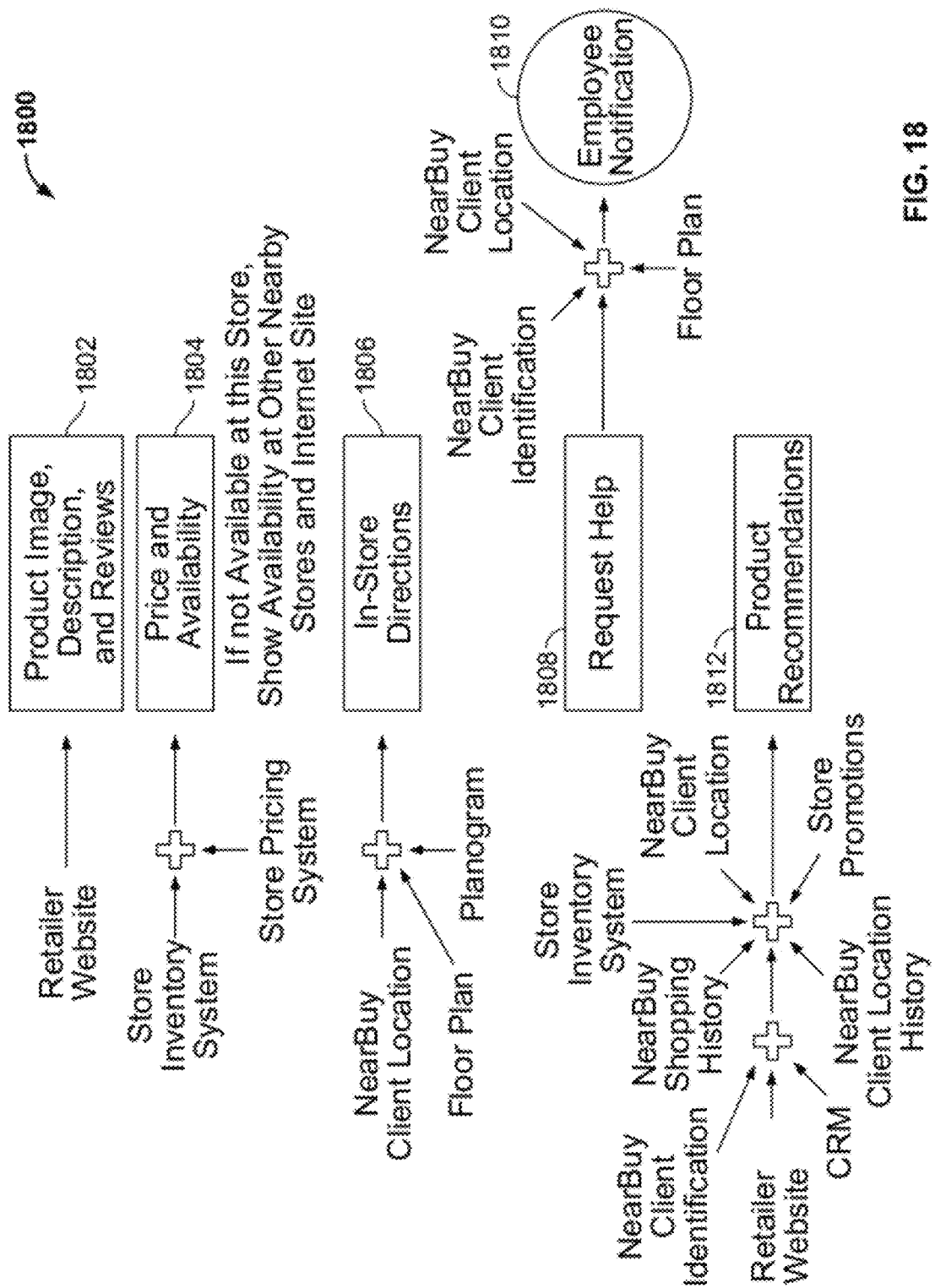
FIG. 18 illustrates an example system for providing mobile product information.

FIG. 18 illustrates an example system 1800 for providing mobile product information. For example, the consumer can drill down into the mobile search results or may scan the barcode on one of the products that they are most interested in to obtain product information. The mobile application can present information about the product including product image, description and reviews, price and availability, in-store direction, ability to request help from in-store associates, and other products that they may be interested in or related items they should consider purchasing.

Figure 19:
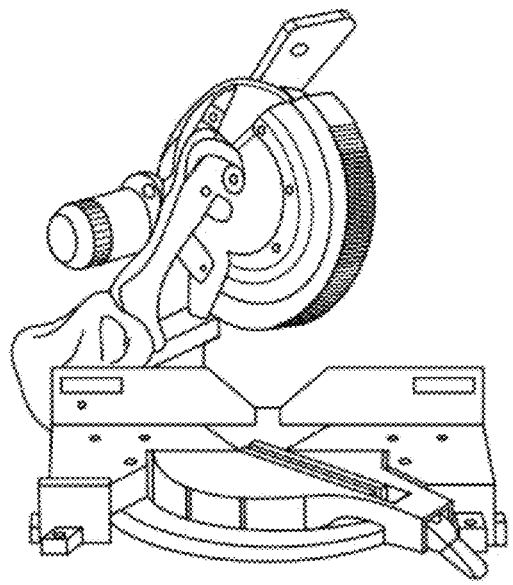
FIG. 19 illustrates an example user interface of a mobile device for displaying product information.

Product information 1802 can include a product image, description and reviews. For example, the product image, description and reviews can be taken directly from the retailer's web site or from a feed from the manufacturer. Price and availability information 1804 can be taken from the store inventory and pricing systems and may be unique for a particular store. FIG. 19 illustrates an example user interface 1900 of a mobile device for displaying product information.

Figure 20:
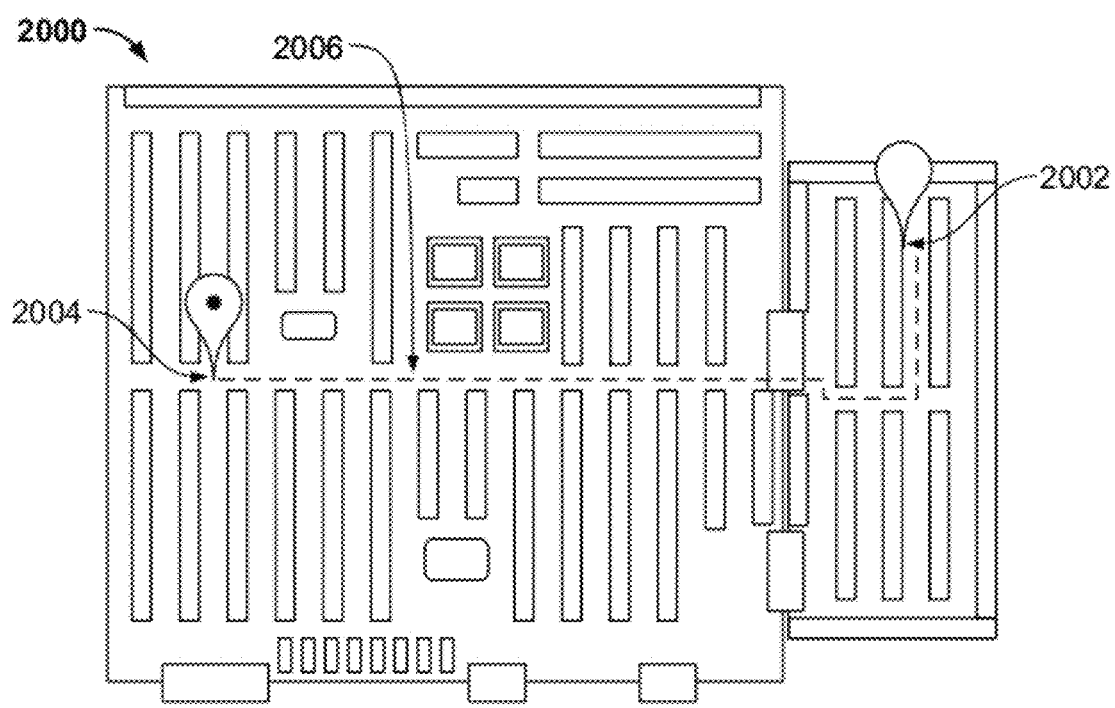
FIG. 20 illustrates an example map for providing in-store directions.

In-store directions 1806 can be based on the generated client location and a planogram that has the location of the product. This imagery can be displayed on the store floor plan and presented back to the customer on the customer's mobile device. FIG. 20 illustrates an example map 2000 that can be displayed on a mobile device for providing in-store directions. Map 2000 can indicate the location of the customer 2004, the location of the product 2002 and the a route 2006 to follow to get from the customer location 2004 to the product location 2002.

Figure 21:
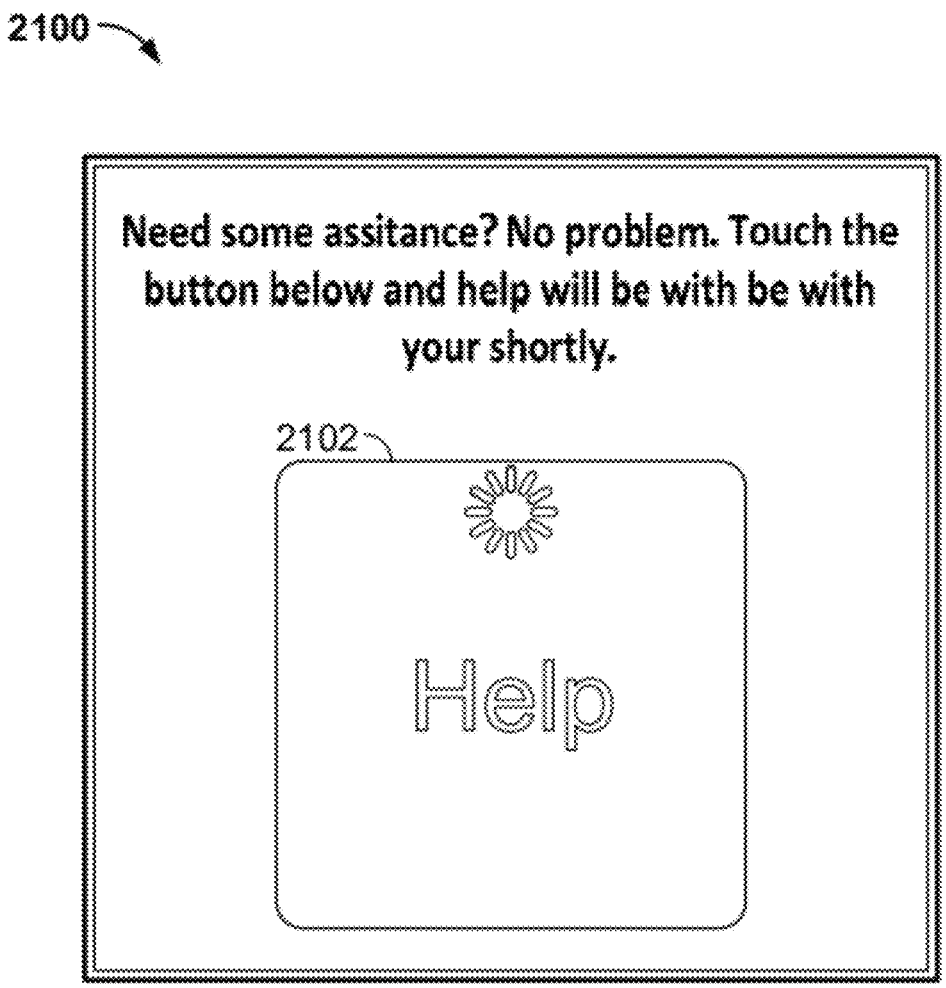
FIG. 21 illustrates an example graphical interface for requesting in-store assistance.

Customers can request help 1808. For example, if the customer needs assistance the customer can push a "help" button on the mobile application, which can summon an in-store sales associate to help them fulfill the purchase or answer questions. System 1800 can relay this request to a device the in-store associated is using, such as a mobile phone, PDA, etc., which can generate an employee notification 1810. FIG. 21 illustrates an example graphical interface 2100 for requesting in-store assistance. Graphical interface 2100 can include help button 2102 for summoning help to the customer's in-store location.

Figure 22:
FIG. 22 illustrates an example graphical interface for providing product recommendations.

The system can also present product recommendations 1812 to the user that are targeted to the mobile application. Based on knowing where the customer is and has been within the store, what inventory the store has, what items are on promotion, and what the customer has been interested in, the system 1800 can come up with a highly targeted list of items to suggest. FIG. 22 illustrates an example graphical interface 2200 for providing product recommendations.

Mobile Purchase

There will be certain cases when the customer may want to purchase the product they are interested in directly from their mobile device while they are in the store. There are often cases where the product is located at the store but is not currently on the shelf or can not be located by the customer. In some implementations, a purchase transaction can be completed on the customer's mobile device. The in-store appliance can receive the purchase information from the customer's mobile device and can send the purchase information to a store employee. The store employee can be directed to find the product (typically in the stock room) and bring the item to the customer located in the store.

Mobile In-Store Advertising

A benefit to the retailer of understanding the location of the shopper is the ability to promote products or services that are relevant to the current or past locations of that shopper. In this case, the current location and location history of the shopper enables the personalization of specific offers and promotions. As an example, as a shopper goes down the soda aisle within a grocery store this is the optimal time for the retailer to send them a Coca-Cola promotion to their phone. Retailers and their manufacturer partners are very interested in being able to influence the consumer at the point of decision, and for many products that is the time when the shopper is in the aisle of the store where their products are sold.

Figure 24:
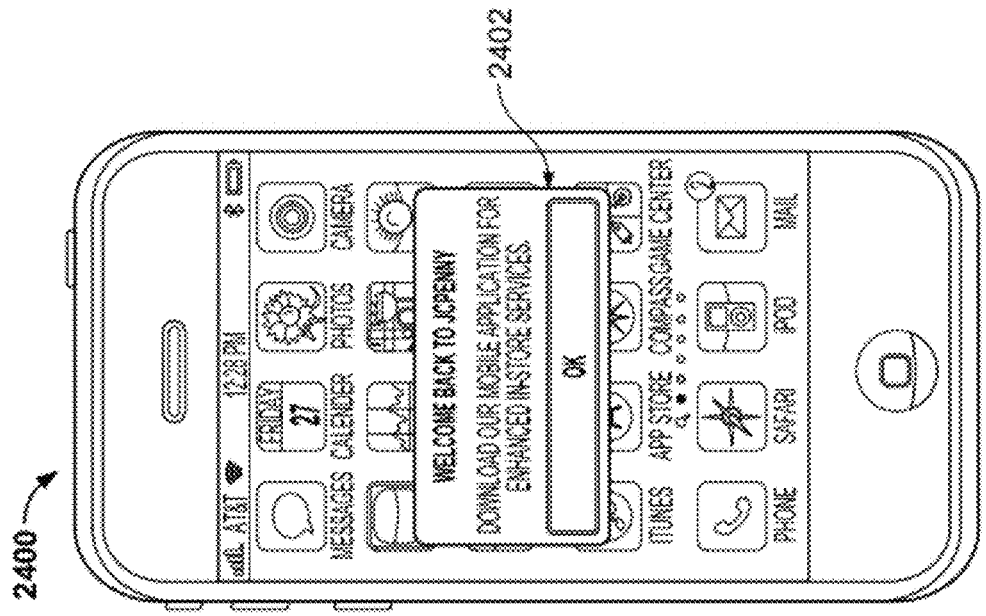
FIG. 24 illustrates a short message service advertisement.
Figure 23:
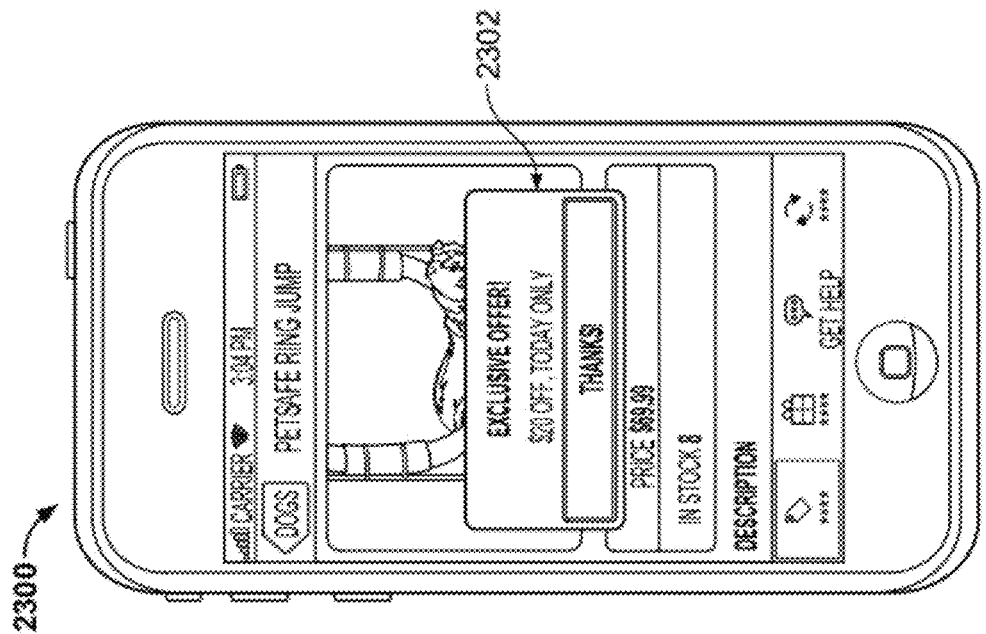
FIG. 23 illustrates an example graphical interface for presenting mobile in-store advertising.

FIG. 23 illustrates an example graphical interface 2300 for presenting mobile in-store advertising. For example, a retailer has an opportunity to provide location specific advertisement to the shopper in several different manners. One option could be providing a coupon as an alert 2302 to a shopping application provided by the retailer. Another option could be by sending a short message service (SMS) message 2402 to the phone of the shopper, as illustrated by FIG. 24.

In some implementations, location information can be bundled with personalization data typically found in a loyalty system in order to provide personalized offers that are location aware.

Analytics

In some implementations, location data can be collected and stored for analysis. For example, this data can form the basis of rich information on shopper and employee patterns within the store. Retail marketers can use this information to better understand how shoppers use the store, where they dwell, how certain offers and promotions can influence their use of the physical store. Internal departments can use this data to better understand how their employees are traveling the store to complete certain tasks, understand ways to optimize certain workflows, and gain a better understanding of where any given employee is at any particular time.

Retail analytics is a massive field today but unfortunately most solutions that focus on the store are only deployed in a few locations or provide a snap-shot in time. With the location technology described herein, a retailer can have access to all of this analytical data in all of their store locations. Most electronic retailers have already instrumented their websites with analytics capabilities to understand how shoppers are using their site. Using implementations described herein, physical retailers can instrument their stores with similar analytics capabilities.

Example System Architecture

FIG. 25 is a block diagram of an exemplary system architecture implementing the features and processes of FIGS. 1-24. The architecture 2500 can be implemented on any electronic device that runs software applications derived from compiled instructions, including without limitation personal computers, servers, smart phones, media players, electronic tablets, game consoles, email devices, etc. In some implementations, the architecture 2500 can include one or more processors 2502, one or more input devices 2504, one or more display devices 2506, one or more network interfaces 2508 and one or more computer-readable mediums 2510. Each of these components can be coupled by bus 2512.

Display device 2506 can be any known display technology, including but not limited to display devices using Liquid Crystal Display (LCD) or Light Emitting Diode (LED) technology. Processor(s) 2502 can use any known processor technology, including but are not limited to graphics processors and multi-core processors. Input device 2504 can be any known input device technology, including but not limited to a keyboard (including a virtual keyboard), mouse, track ball, and touch-sensitive pad or display. Bus 2512 can be any known internal or external bus technology, including but not limited to ISA, EISA, PCI, PCI Express, NuBus, USB, Serial ATA or FireWire. Computer-readable medium 2510 can be any medium that participates in providing instructions to processor(s) 2502 for execution, including without limitation, non-volatile storage media (e.g., optical disks, magnetic disks, flash drives, etc.) or volatile media (e.g., SDRAM, ROM, etc.).

Computer-readable medium 2510 can include various instructions 2514 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 2504; sending output to display device 2506; keeping track of files and directories on computer-readable medium 2510; controlling peripheral devices (e.g., disk drives, printers, etc.) which can be controlled directly or through an I/O controller; and managing traffic on bus 2512. Network communications instructions 2516 can establish and maintain network connections (e.g., software for implementing communication protocols, such as TCP/IP, HTTP, Ethernet, etc.).

A graphics processing system 2518 can include instructions that provide graphics and image processing capabilities. For example, the graphics processing system 2518 can implement the processes described with reference to FIGS. 1-24. Application(s) 2520 can be an application that uses or implements the processes described in reference to FIGS. 1-24. The processes can also be implemented in operating system 2514.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
   obtaining, by a computing device, image data associated with an object;

estimating, by the computing device, a first location of the object based on the image data and a first probability grid, where the image data is used to generate a value for each cell of the first probability grid that indicates a probability that a first probability grid cell is occupied by the object;

obtaining, by the computing device, wireless signal data from a device;

estimating, by the computing device, a second location of the device based on the wireless signal data and a second probability grid, where the wireless signal data is used to generate a value for each cell of the second probability grid that indicates a probability that a second probability grid cell is occupied by the device; and multiplying each of the first probability grid cells with respective cells of the second probability grid to determine which two corresponding grid cells produce a largest probability across the first and second probability grids; and estimating, by the computing device, a current location of the device based on corresponding grid cells that produce the largest probability.

2. The method of claim 1, where estimating the first location of the object based on the image data comprises:
transforming the image data through a ground plane homography projection.

3. The method of claim 1, wherein the image data comprises images captured by different cameras having overlapping fields of view.

4. The method of claim 1, wherein estimating the first location of the object comprises calculating an object track corresponding to the object.

5. The method of claim 1, wherein obtaining wireless signal data from the device includes obtaining device identification information from the wireless signal data.

6. A system comprising:
one or more processors; and
a computer-readable medium including one or more sequences of instructions which, when executed by the one or more processors, causes:
obtaining image data associated with an object;
estimating a first location of the object based on the image data and a first probability grid, where the image data is used to generate a value for each cell of the first probability grid that indicates a probability that a first probability grid cell is occupied by the object;
obtaining wireless signal data from a device;
estimating a second location of the device based on the wireless signal data and a second probability grid, where the wireless signal data is used to generate a value for each cell of the second probability grid that indicates a probability that a second probability grid cell is occupied by the device;
multiplying each of the first probability grid cells with respective cells of the second probability grid to determine which two corresponding grid cells produce a largest probability across the first and second probability grids; and
estimating a current location of the device based on the corresponding grid cells that produce the largest probability.

7. The system of claim 6, wherein the instructions that cause estimating the first location of the object based on the image data comprise instructions that cause transforming the image data through a ground plane homography projection.

8. The system of claim 6, wherein the image data comprises images captured by different cameras having overlapping fields of view.

9. The system of claim 6, wherein the instructions that cause estimating the first location of the object comprise instructions that cause calculating an object track corresponding to the object.

10. The system of claim 6, wherein the instructions that cause obtaining wireless signal data from the device comprise instructions that cause obtaining device identification information from the wireless signal data.

11. A non-transitory computer-readable medium including one or more sequences of instructions which, when executed by one or more processors, causes:
obtaining image data associated with an object;
estimating a first location of the object based on the image data and a first probability grid, where the image data is used to generate a value for each cell of the first probability grid that indicates a probability that a first probability grid cell is occupied by the object;
obtaining wireless signal data from a device;
estimating a second location of the device based on the wireless signal data and a second probability grid, where the wireless signal data is used to generate a value for each cell of the second probability grid that indicates a probability that a second probability grid cell is occupied by the device;
multiplying each of the first probability grid cells with respective cells of the second probability grid to determine which two corresponding grid cells produce a largest probability across the first and second probability grids; and
estimating a current location of the device based on the corresponding grid cells that produce the largest probability.

12. The non-transitory computer-readable medium of claim 11, wherein the instructions that cause estimating the first location of the object based on the image data comprise instructions that cause transforming the image data through a ground plane homography projection.

13. The non-transitory computer-readable medium of claim 11, wherein the image data comprises images captured by different cameras having overlapping fields of view.

14. The non-transitory computer-readable medium of claim 11, wherein the instructions that cause estimating the first location of the object comprise instructions that cause calculating an object track corresponding to the object.

15. The non-transitory computer-readable medium of claim 11, wherein the instructions that cause obtaining wireless signal data from the device comprise instructions that cause obtaining device identification information from the wireless signal data.

* * * * *